(12) United States Patent
Brodersen et al.

(10) Patent No.: US 6,665,648 B2
(45) Date of Patent: Dec. 16, 2003

(54) STATE MODELS FOR MONITORING PROCESS

(75) Inventors: Karen Cheung Brodersen, Redwood City, CA (US); Michael Tsunghsi Yu, San Jose, CA (US); Jai-Jein Yu, Fremont, CA (US); Andrzej P. Mazur, San Jose, CA (US); Brian K. Groves, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 35 days.

(21) Appl. No.: 09/579,336

(22) Filed: May 25, 2000

(65) Prior Publication Data

US 2002/0152102 A1 Oct. 17, 2002

Related U.S. Application Data

(63) Continuation of application No. PCT/US99/28357, filed on Nov. 30, 1999.
(60) Provisional application No. 60/110,192, filed on Nov. 30, 1998.

(51) Int. Cl.[7] .............................................. G06F 17/60
(52) U.S. Cl. ...................... 705/7; 705/1; 705/2; 705/35
(58) Field of Search ............................ 705/1, 7, 8, 35; 703/8; 707/103, 6, 102; 709/102; 717/1; 345/433

(56) References Cited

U.S. PATENT DOCUMENTS

| 5,220,668 A | * | 6/1993 | Bullis ......................... 709/102 |
| 5,255,181 A | | 10/1993 | Chapman et al. |
| 5,303,147 A | | 4/1994 | Oba et al. |
| 5,321,605 A | | 6/1994 | Chapman et al. |

(List continued on next page.)

FOREIGN PATENT DOCUMENTS

WO   PCT/US99/28357   11/1999

OTHER PUBLICATIONS

Business process flow management and its application in the Telecommunications Management Network. (HP's OpenPM middleware technology) (Technology Information), Shan, Ming–Chien; Davis, James W.; Du, Weimin, Chen, Qiming. Hewlett–Packard Journal, v47.*

(List continued on next page.)

*Primary Examiner*—Tariq R. Hafiz
*Assistant Examiner*—M. Irshadullah
(74) *Attorney, Agent, or Firm*—James W. Soong; Perkins Coie LLP

(57) ABSTRACT

System and method for preparing, using, and displaying a state model of a process, as an industrial or business process, as a sequence of discrete steps. The state model defines the behavior of the logical objects making up a process model of the process as (1) a set of permitted states and (2) a set of permitted transitions between the permitted states. The state model is created by selecting a template for the state model, and selecting industrial or business object components for the state model (for example, by using "OOP" methods or other programming paradigms). The user then selects or defines state transitions for the state model, for example, by defining permitted state transitions from a "from state" to a "to state". The defined or selected state transition rules are identified to State Transition Rule names. That is, state transitions are associated to specific state transition rules, names, and conditions, and the state transition names and state transition rule names are enumerated. The specific state transition rules corresponding to the names are extracted from a database. The extracted states, transitions, and rules define the state machine execution engine. This state machine execution engine is used to process business models.

51 Claims, 6 Drawing Sheets

U.S. PATENT DOCUMENTS

| | | | | |
|---|---|---|---|---|
| 5,893,070 A | * | 4/1999 | Garber et al. | 705/2 |
| 6,040,838 A | * | 3/2000 | Webb et al. | 345/433 |
| 6,110,215 A | * | 8/2000 | Stone | 703/6 |
| 6,134,559 A | * | 10/2000 | Brumme et al. | 707/103 R |
| 6,182,277 B1 | * | 1/2001 | DeGroot et al. | 717/1 |
| 6,199,030 B1 | * | 3/2001 | Stone | 703/8 |
| 6,233,565 B1 | * | 5/2001 | Lewis et al. | 705/35 |

OTHER PUBLICATIONS

Easy Web publishing. (askSams system's askSam Web Publisher Professional Edition 2.0) (Software Review) (Evaluation), Vrona, Susan. Data Based Advisor, v15, n3, p14(4), Mach 1997.*

DRC announces Visual Magic. (Dynamic Research Corp's VisualMagic object–oriented design and system development environment) (Brief Article) (Product Announcement). C/C++ Users Journal, v15, n3, p102(Mar. 10, 1997.*

Popkin Software & Systems, Inc. Announces System Architectect/BPR Professional; New Tool Supports All IDEF Methods and Jacobson Use–case Diagrams. Business Wire, p12050017, Dec. 5, 1995.*

Seers technologies Ships SEER/HPS Version 5.2. PR Newswire, p0920NY043, Sept. 20, 1993.*

* cited by examiner

STATE MODELS FOR MONITORING PROCESS

CROSS-REFERENCE TO RELATED APPLICATIONS

This application is a continuation of PCT Application PCT/US99/28357, filed Nov. 30, 1999 and Provisional Application No. 60/110,192, filed Nov. 30, 1998.

FIELD OF THE INVENTION

This invention relates to state models and state model development for defining and monitoring processes, more specifically, for monitoring industrial and business processes.

BACKGROUND

As the business environment becomes more complex, with multiple, overlapping channels, competing and complementary paradigms, providing customized products to large numbers of customers, it becomes absolutely essential for the enterprise to bring its business processes under control. Control of the business process must be accomplished in such a way as to provide management with accurate and current knowledge of the state of business, including deals in progress, and their progression through the enterprise.

There is an especially strong need for a readily scalable and readily deployable development environment, including development tools, to allow end users to develop business applications customized to their needs and derived from supplied base classes, functions, subroutines, and the like.

Likewise, in the industrial sector as industrial processes become longer and more complex, with parallel paths of discrete process steps, frequently carried out at different locations, leading to nodes, and to still further process steps. This has created a need for a readily scalable and readily deployable development environment to allow end users to develop industrial modeling applications derived from supplied classes, functions, routines, and subroutines.

A particular need for programming tools is in the area of the representation of a process as a sequence of discrete, frequently parallel, steps, as in flow charts, and especially funnel charts.

A further need exists for development tools for the development of pipeline models, as industrial, manufacturing or sales pipeline models.

A still further need exists for development tools for assistant modules, as industrial, manufacturing or sales assistant modules used to guide personnel through manufacturing sequences and sales transactions.

SUMMARY OF THE INVENTION

Our invention relates to state models of "objects" and especially configurable state models of "objects." "Objects" which are referred to herein as "business objects" or as "objects" include sets of functions, and variables, characterized by permitted states and transitions, and prohibited states and transitions. The objects may model steps or states in a business process or in a manufacturing process. Objects may be called by an end-user, and incorporated into an end-user's programs, routines, subroutines, functions, and applets. According to our invention the "objects" are related to and/or are useful in one or more types of industrial and manufacturing processes, business transactions, and/or business processes, such as product fabrication, product assembly, warehousing, shipping, customer contacts, sales leads and referrals, orders, order configuration, and similar transactions.

The invention provides a method of preparing a state model of a process, as an industrial or business process. The state model defines the behavior of logical industrial or business objects in an industrial or business process model of the industrial or business process as a set of permitted states and a set of permitted transitions between the permitted states. This is done through the steps of selecting a template for the state model; selecting industrial or business object components for the state model; selecting or defining state transitions for the state model; defining permitted state transitions from a "from state" to a "to state" with a State Transition Rule name; associating state transitions with state transition rules, names, and conditions; enumerating the state transition names and state transition rule names; and extracting the state transition rules from a database. The states, transitions, and extracted rules make up a state machine execution engine; and process the industrial and/or business model through the state machine execution engine.

At least one of the state transition rules include prerequisites which must be met before the transition is permitted, and at least one of the state transition rules define authorized users for effecting a state transition.

In one embodiment of the invention the business objects define a manufacturing or sales pipeline funnel model (here illustrated as a sales pipeline) of a set of industrial processes or business deals (here illustrated as business deals), where the sales pipeline funnel shows business deals being worked in different methodologies on a single sales pipeline graphic. The methodologies are chosen from the, for example, telesales process deals, strategic deals, and standard process deals.

In this embodiment of the invention the business deals may be grouped by sales methodology, and classified as, for example, as qualifying deals, working deals, and closing deals. Similarly, industrial processes may be grouped by technology, physical processes, equipment, or the like.

In the case of business models, the method of the invention is practiced by creating a sales opportunity, creating a sales method, breaking the sales method into sales cycles within the sales method, and breaking the sales cycles down into sales phases for each sales cycle. In the case of industrial models, the method of the invention is practiced by creating process flows, manufacturing steps, identifying manufacturing steps to manufacturing equipment or processes, and introducing testing and/or quality control steps.

In carrying out the method of the invention a sales method is associated with a sales opportunity, and the sales opportunity is advanced based upon the associated sales method. Sales opportunities are sorted and grouped by at least one of sales methods, cycles, and phases. The deal data, grouped by one or more of sales method, sales cycle, and deal phase, to a charting engine, and from the charting engine to the Sales Pipeline Funnel Chart.

An aspect of the method of the invention is monitoring the state of deal or product as it moves from state to state, for example, to determine additional actions with respect to the deal or product.

Another aspect of the invention is assigning activity and assessment templates to a deal or product in process, for example, to assess the deal or manufacturing process flow using the assigned activity and assessment templates.

A further embodiment of our invention is a system running on at least one computer (but frequently on more then one computer, as a client and a server, or a web client and a web server and one or more application servers) for preparing a state model of a process as described above. The state model defines the behavior of logical business or industrial objects in a business or industrial process model of the process as a set of permitted states and a set of permitted transitions between the permitted states. The system is configured to: select a template for the state model; select object components for the state model; select or define state transitions for the state model; define permitted state transitions from a "from state" to a "to state" with a State Transition Rule name; associate state transitions with state transition rules, names, and conditions; enumerate the state transition names and state transition rule names; extract the state transition rules from a database; wherein the states, transitions, and extracted rules comprise a state machine execution engine; and process a business model through the state machine execution engine.

In the system and method of our invention we provide a unique integration, through a state model and state machine of several objects, as industrial or business objects, to provide graphical reports, such as a Multiple Method Sales Pipeline, a Funnel Chart Engine, and a set of reporting tools. As a result, data, including sales pipe line data and industrial work-in-progress data, can be reported graphically across multiple sales methods and industrial methods and locations using such techniques as funnel charting, sales pipelines, and customized reporting techniques.

The invention described herein includes a method and a system for preparing and using a state model of an industrial or business process. The state model defines the behavior of the logical objects making up a business process model of the business process as (1) a set of permitted states and (2) a set of permitted transitions between the permitted states. The state model is created by selecting a template for the state model, and selecting industrial or business object components for the state model (for example, by using "OOP" or other programming paradigms and methods as described herein). The user then selects or defines state transitions for the state model, for example, by defining permitted state transitions from a "from state" to a "to state". This is the "configurability" aspect of the state model. The defined or selected state transition rules are identified to State Transition Rule names. That is, state transitions are associated to specific state transition rules, names, and conditions, and the state transition names and state transition rule names are enumerated. The specific state transition rules corresponding to the names are extracted from a database. The extracted states, transitions, and rules define the state machine execution engine. This state machine execution engine is used to process business models, as described herein.

THE FIGURES

The method and system of our invention may be understood with reference to the Figures.

DETAILED DESCRIPTION OF THE INVENTION

Figure 1:
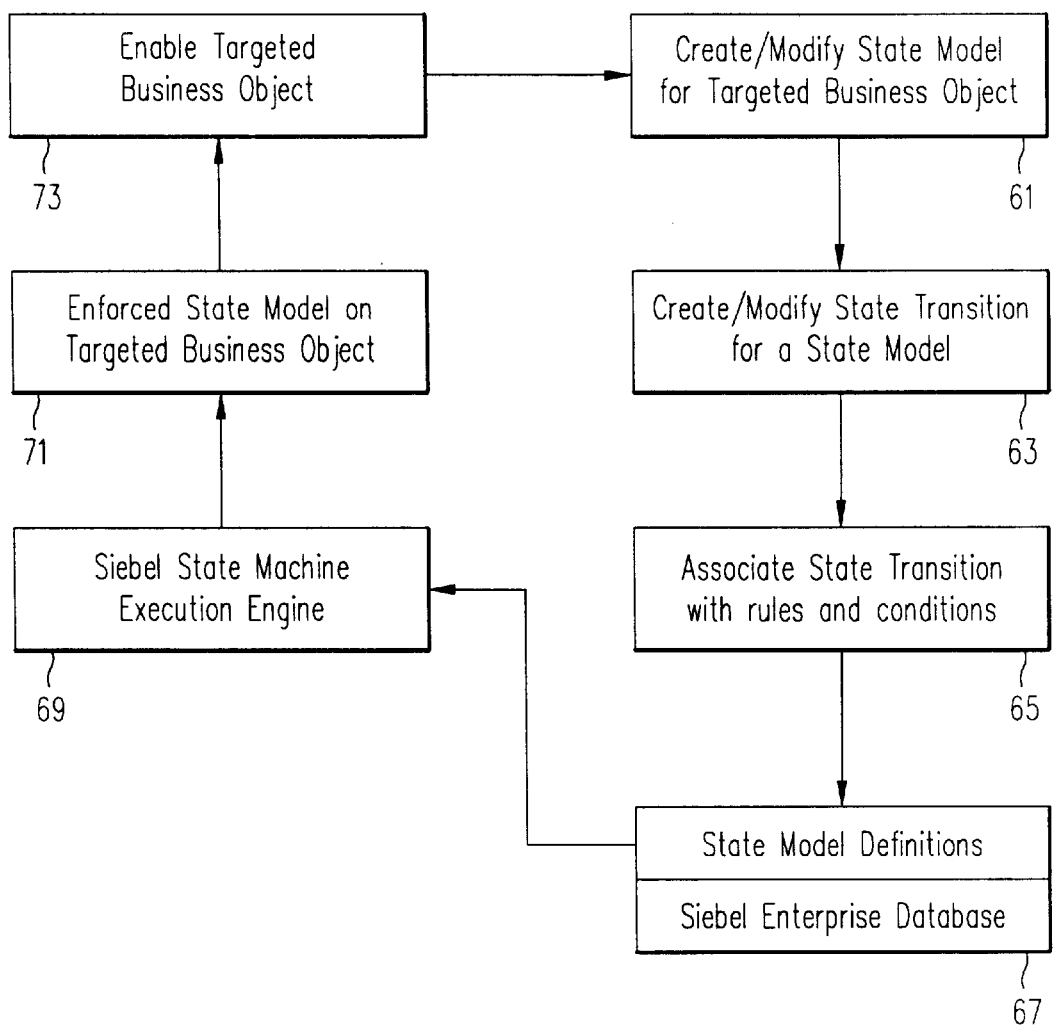
FIG. 1 illustrates a flow chart of the Configurable State Module of the method and system of our invention.

The system and method of our invention relate to "objects" including industrial and business objects, that are associated through a "configurable state model" having sets of permitted states and sets of permitted transitions to provide a manager with needed information, and with tools to extract, analyze, and display the information. This is accomplished through such business objects as an opportunity object, a sales method object, a multi-method sales pipeline object, and a funnel chart engine business object, as well as such industrial objects as manufacturing operations, manufacturing equipment, workflow, capacities, and the like.

As pointed out above, "objects" include sets of functions, variables, routines, and subroutines and configurable state models. Objects may be called by an end-user, and incorporated into an end-user program, routines, and applets. According to our invention when the "objects" are business objects they relate to and/or are useful in one or more types of business transactions and/or business processes, such as customer contacts, sales leads and referrals, orders, order configuration, and similar transactions. Similarly, when the "objects" are industrial objects they are related to and/or useful in one or more types of industrial, manufacturing, or warehousing processes.

Our invention utilizes a configurable state model of processes. The configurable state model defines the behavior of the logical industrial or business objects, including functions and variables therein, making up an industrial or business process model of the industrial or business process as (1) a set of permitted states and (2) a set of permitted transitions between the permitted states.

The Configurable State Model provides users with a data driven method for extending workflow control based on the status of an object. In order to make this work, users need to define the state model which consists of a set of acceptable states and state transitions. The state machine then ensures that these objects go through the desired process defined by the state model.

The configurable state model is created by selecting a template for the state model, and selecting business object components for the state model (for example, by using "OOP" methods, such as calling a member function with a calling object, using the C++ syntax Calling_Object.Member_Function (Argument_List) as described herein or the JAVA syntax, or by calling routines, subroutines, functions, and the like as in conventional programming paradigms, using, for example BASIC, FORTRAN, C, and the like). The user then selects or defines state transitions for the state model, for example, by defining permitted state transitions from a "from state" to a "to state", as by specifying arguments in the "Argument_List" of the called Member_Function. The defined or selected state transition rules are identified to State Transition Rule names. That is, state transitions are associated to specific state transition rules, names, and conditions, and the state transition names and state transition rule names are enumerated, using object oriented programming methodology. The specific state transition rules corresponding to the names are extracted from a database of state transition rules. The extracted states, transitions, and rules define the state machine execution engine. This state machine execution engine is used to process business models, as described herein.

In the configurable state model and associated applications of the method and system of our invention, we provide a unique integration of several business objects with an interactive synergy therebetween through the configurable state model.

For example, in the Funnel Chart application of our invention, multiple streams of sales transactions and customers at different levels of completion can be integrated and the resulting sales pipeline data can be reported graphically across multiple sales methods using funnel charting technique. Similarly the Funnel Chart application of our invention can be used to graphically report industrial processes similar to the "N Server-M Queue" models.

The components that are associated in the system and method of the invention are:

A state model which is a characterization of objects as a set of configurable state models, each configurable state model itself being a set of permitted states and permitted transitions between the permitted states, including permitted state transitions, prerequisites for transitions such that one cannot move into the next stage until the prerequisite is met, and actors that are permitted to move the process to a stage (e.g., only specific users may change the status of the object to "approved" or "closed.").

Figure 4:
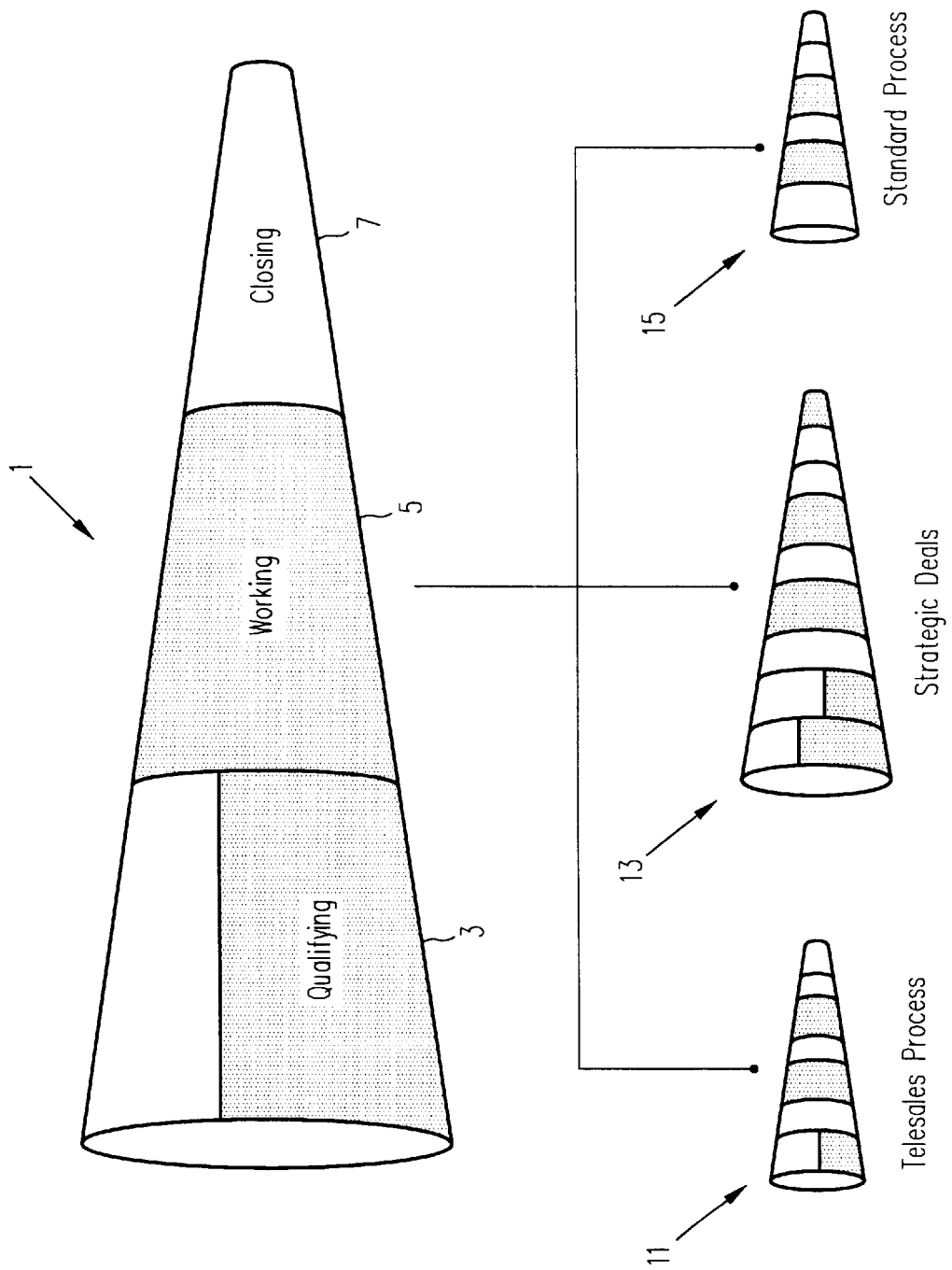
FIG. 4 illustrates a funnel chart engine representation of the method and system of our invention.

A funnel chart engine, as shown in FIG. 4, that, given specific charting instructions, generates graphical chart based on the sales pipeline and sales methods. As shown in FIG. 4, the funnel chart engine breaks deals up into classes, for example, qualifying deals, working deals, and closing deals. Within each class are categories of deals, such as telesales process deals, strategic deals, and standard process deals.

An opportunity object which is a business object that keeps information about a sales opportunity.

A sales method object which is a business object that allows a user to create and store data related to sales methodology, including sales cycles and phases.

Related objects for industrial processes can include shop orders, equipment and process flow chart and sequencing parameter data, capacities, and the like.

Specific Components of the System and Method

State Model

Returning to the state model, the state model is part of the system and method of our invention. A state model is an abstraction of a digital device where the present state (output state) of the model is a function of its immediately preceding state (input state) and of a binary control signal (input control signal). In a state model, the output state of the model is a unique function of the input state and the input control signal (0, 1). According to the system and method of our invention, the "state model" works through a "state machine" with the business objects to define allowable state values, transitions, and paths.

The state model defines the behavior of logical objects, as industrial or business objects, as a set of states and transitions between states. In addition to defining the universe of permitted values and transitions, the state model allows administrators to define prerequisites for transitions such that one cannot move into the next stage until the prerequisite is met.

The state model also defines authorized "users" (by title or by security access or the like) that are permitted to move the state model of a transaction or workpiece to a state. Only specific users may change the state of the object, for example by advancing it to the next state, or to "approved" or "closed." Moreover, the authority or power to change the state of an object may be function of both the user and the present state. For example, a manager may have the power to "approve" or "disapprove" a deal at the nth state, but not when the deal reaches the n+1th state. Similarly, a manufacturing technician can divert a workpiece from the nth tool to the n+1th tool, but can not divert the workpiece further once it has reached the n+1th tool. "Position" as shown in blocks 70 ("State Transition/Position") and 75 ("Position") of FIG. 2 defines the "user."

The state model is the blueprint of acceptable states and state transitions that the state machine will enforce. The state machine then ensures that these objects go through the desired process defined in the state model.

A state machine is an engine that enforces the transitions between states for an object during its lifetime. A state represents the status of an object, such as Open, Closed, Pending, and so on. The state represents where the object is in its lifetime. The state machine can also control whether or not the data of that object can be modified or not. As an example, a Service Request that is in a Closed state may be considered "frozen", such that its attributes cannot be modified.

A state transition defines the allowable migration of an object from one state to the next. For instance, a Service Request that has been closed but must be re-opened may go from the Closed state to an Open state, and may go from Open to Pending, but may not transition directly from Closed to Pending. The allowable migration of a Service Request from Closed to Open, or Open to Pending, represents defined state transitions. The state transition can also enforce other behavior. The state transition definition can verify that specific conditions have been met before the transition occurs. The state transition definition can also control what individuals or groups of individuals can initiate the transition.

Configurable State Models—Technical Description

Figure 3:
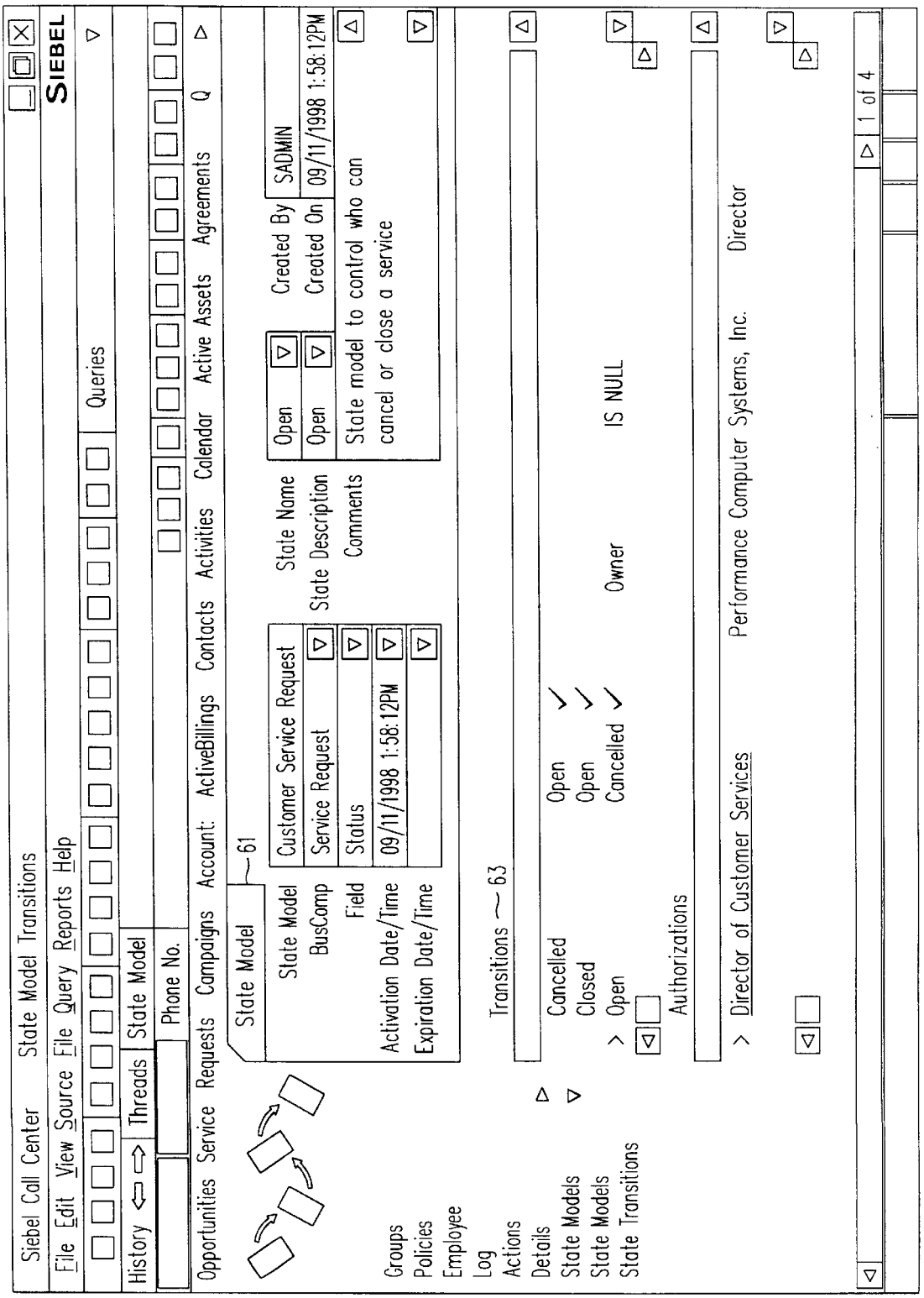
FIG. 3 illustrates a screen shot of the State Model view of our invention.

The Configurable State Model module illustrated in FIG. 1 provides users with a data driven method for extending workflow control based on the status of an object. In order to make this work, users need to define the state model, which consists of a set of acceptable states and permitted state transitions. The state machine then ensures that these objects go through the desired process defined by the state model. According to the system and method of our invention, the configurable state model is used in the context of logical business objects. Specifically, state model states and transitions are defined for business objects using an intuitive user interface, with limitations put upon those who can transition objects from one state to another state. FIG. 3 is a screen shot of the State Model view of our invention.

The State Model consists of the following components:

State: The state is the status of an object. This can also refer to the value of an attribute where the attribute will change values over the life of the object. Value can be Boolean, alphanumeric, or numeric.

State Transition: A state transition is a linkage or set of linkages between two states that define the allowable migration from one state to the next. We can add the rule validations to a state transition and the state machine will determine if we can advance to the next state or not at run time. Also we can define who has the privilege to advance to the next state by defining the authorized users.

State Model: The state model is the set or blueprint of allowable states and state transitions that the state machine will enforce.

State Machine. The State Machine is the engine that enforces the states and state transitions that an object may go through during its lifetime.

Figure 2:
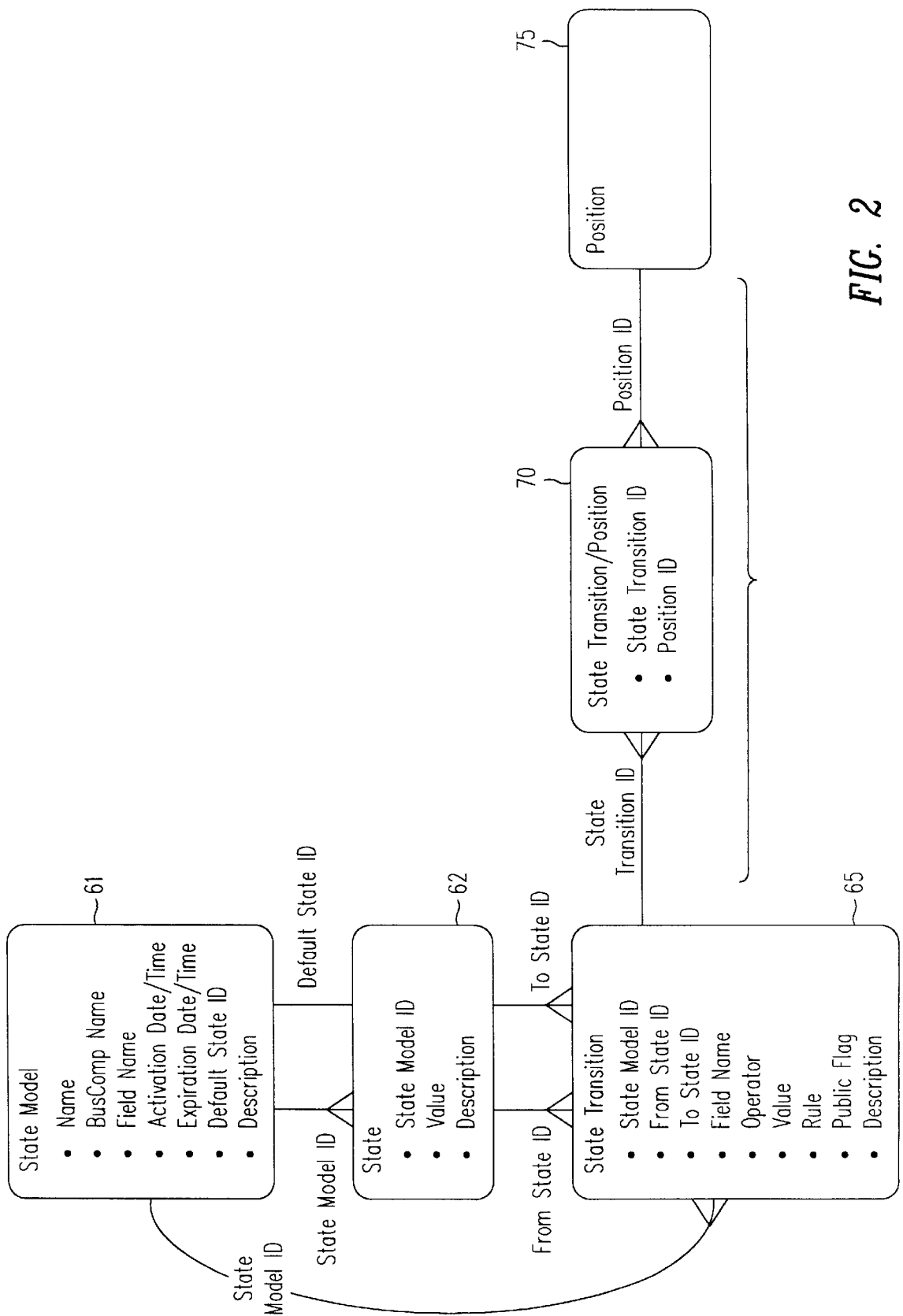
FIG. 2 shows the relations of the state model, and specifically, the state model, the state, the state transitions, the state transitions and positions, and the positions.

As shown in FIGS. 1, 2, and 3, the first step in the method of our invention is to create a state model or modify an existing state model, block 61 of FIGS. 1 and 2 and block 62 of FIG. 2 where certain parameters ("State Model ID," "Value," "Description"). This is illustrated in FIG. 3 as the actions called for in the top block, that is, entering and/or selecting the "State Model," the "Business Component" of the "State Model", the "Field", and the "Activation Date/Time" and the "Expiration Date/Time". The next two steps are to "Create/Modify State Transition for a State Model" as illustrated in block 63 of FIGS. 1 and 2, and "Associate State Transition With Rules and Conditions" as shown in block 65. This is illustrated by block 65 of FIG. 2 (where "State Model ID," "From State ID," "To State ID," "Field Name," "Operator," "Value," "Rule," "Public Flag," and "Description" are entered into the "State Transition" block). Each permitted transition has a "From State Name", a "To State Name", a "Public Flag", a "Rule Field Name" a "Rule Operator", and a "Rule". Typically, state machine and state model rules are expressed as "If present state is '0' and input is '0', then new state is '1', but if input is '1 ',then new state is '0'; and if present state is '1' and the input is '0', then the output is '0'. but if the input is '1', then the output is '1'.

As shown in the next block of FIG. 1, entering these rules into the graphical user interface of FIG. 3 causes the appropriate rules to be extracted from the database, block 67, and, in the next block, assembled into a state machine execution engine, block 69 of FIG. 1 and implemented as in block 70 of FIG. 2. This produces an enforced state model on targeted business objects, block 71, and the target business object is enabled, as shown in block 73.

The State Model Class Definition reproduced in Appendix A and the State Machine Source Code is reproduced in Appendix B.

Multi-Method Sales Pipeline

The multi-method sales pipeline method and system of our invention is illustrated in FIG. 4. FIG. 4 shows a large funnel 1 and small funnels 11, 13, and 15 representing deals being worked in different methodologies on a single sales pipeline graphic. The small funnels, 11, 13, and 15, represent the sales pipelines of a group of deals being worked in a single methodology. The bigger funnel 1 at the top represents a way to combine the small ones and compare the value of all of the deals to the sales person's quota. As shown in FIG. 4, the funnel chart engine breaks deals up into classes, for example, qualifying deals, 3, working deals, 5, and closing deals, 7. Within each class are categories of deals, such as telesales process deals, 11, strategic deals, 13, and standard process deals, 15.

Figure 5:
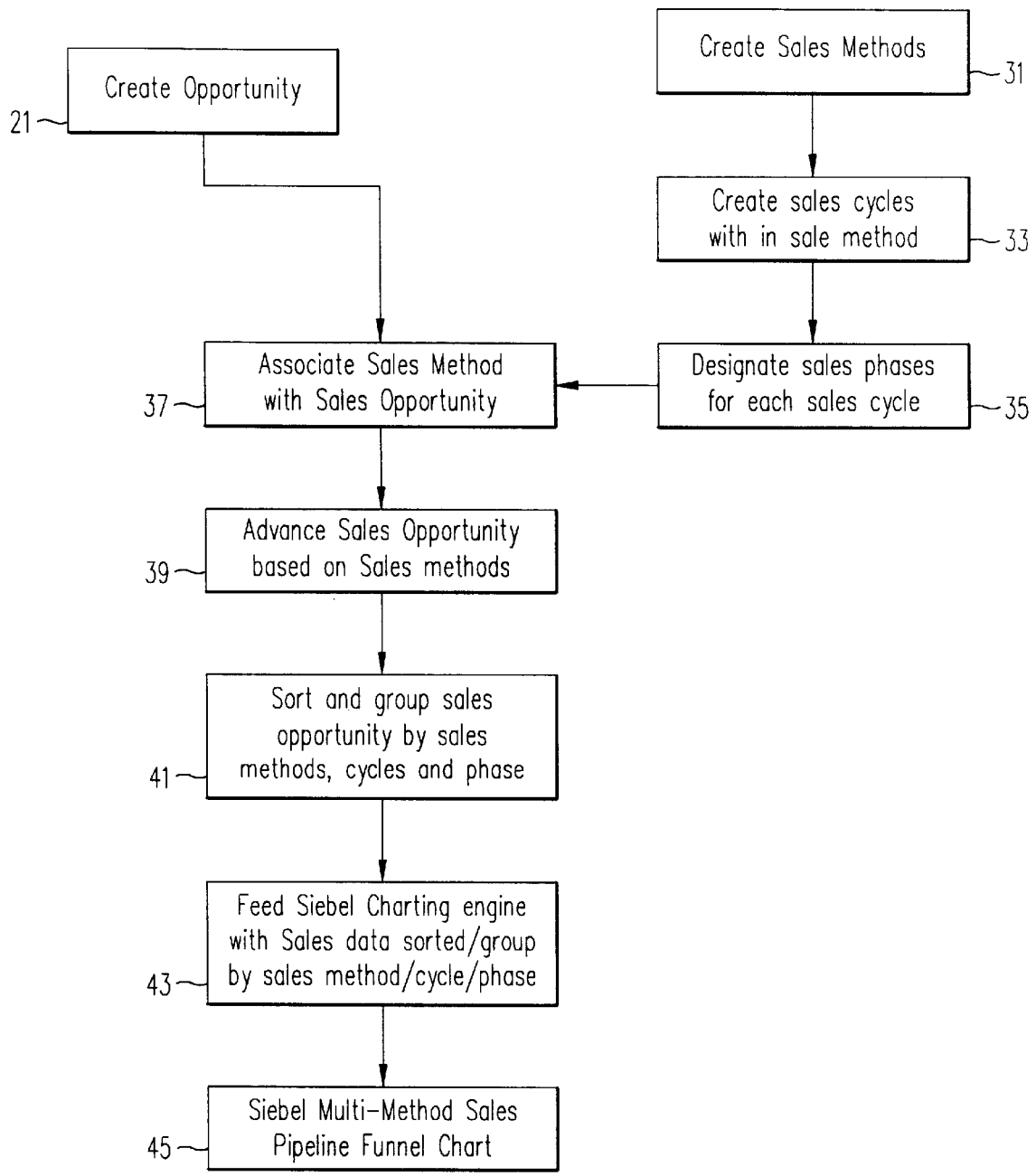
FIG. 5 illustrates a flow chart of the method and system of the multi-method sales pipeline module of our invention.

A flow chart of this embodiment of the system and method of our invention is shown in FIG. 5. As shown in FIG. 5, an opportunity is created on one side, block 21, and a sales method is created on the other side, block 31, which method is broken down into sales cycles within the sales method, block 33, and further broken down into sales phases, block 35, for each of the sales cycles, block 33. The processed sales method and the opportunity are brought together, as shown in block 37, and the sales method associated with a sales opportunity. The sales opportunity is then advanced based upon the sales method, as shown in block 39. The sales opportunities are then sorted and grouped by sales methods, cycles, and phases, as shown in block 41. The data, grouped by sales method, sales cycle, and deal phase, is then passed to a charting engine, as shown in block 43, and from the charting engine to the Sales Pipeline Funnel Chart of FIG. 4, as shown in block 45 of FIG. 5.

Sales Assistant

The sales assistant module of the system and method of our invention monitors the state of the deal as it is being worked and suggests, but need not require, specific actions and evaluations ("assessments") that should be performed based on the methodology employed for that specific deal. Using the state model, as deals move from stage to stage, the sales assistant module continues to monitor the deals to determine (based on the then current methodology) whether additional actions or assessments should be suggested. A flow chart for the Sales Assistant is shown in FIG. 6.

The Sales Assistant is a coaching tool. With the Sales Assistant, everyone in an organization can learn from each other, and especially from the most experienced sales reps. Activity Templates automatically list, schedule, and assign all of the activities that are needed to move sales opportunities quickly from one sales stage to the next. Assessments compare like opportunities with a "model" or "optimal" opportunity.

Figure 6:
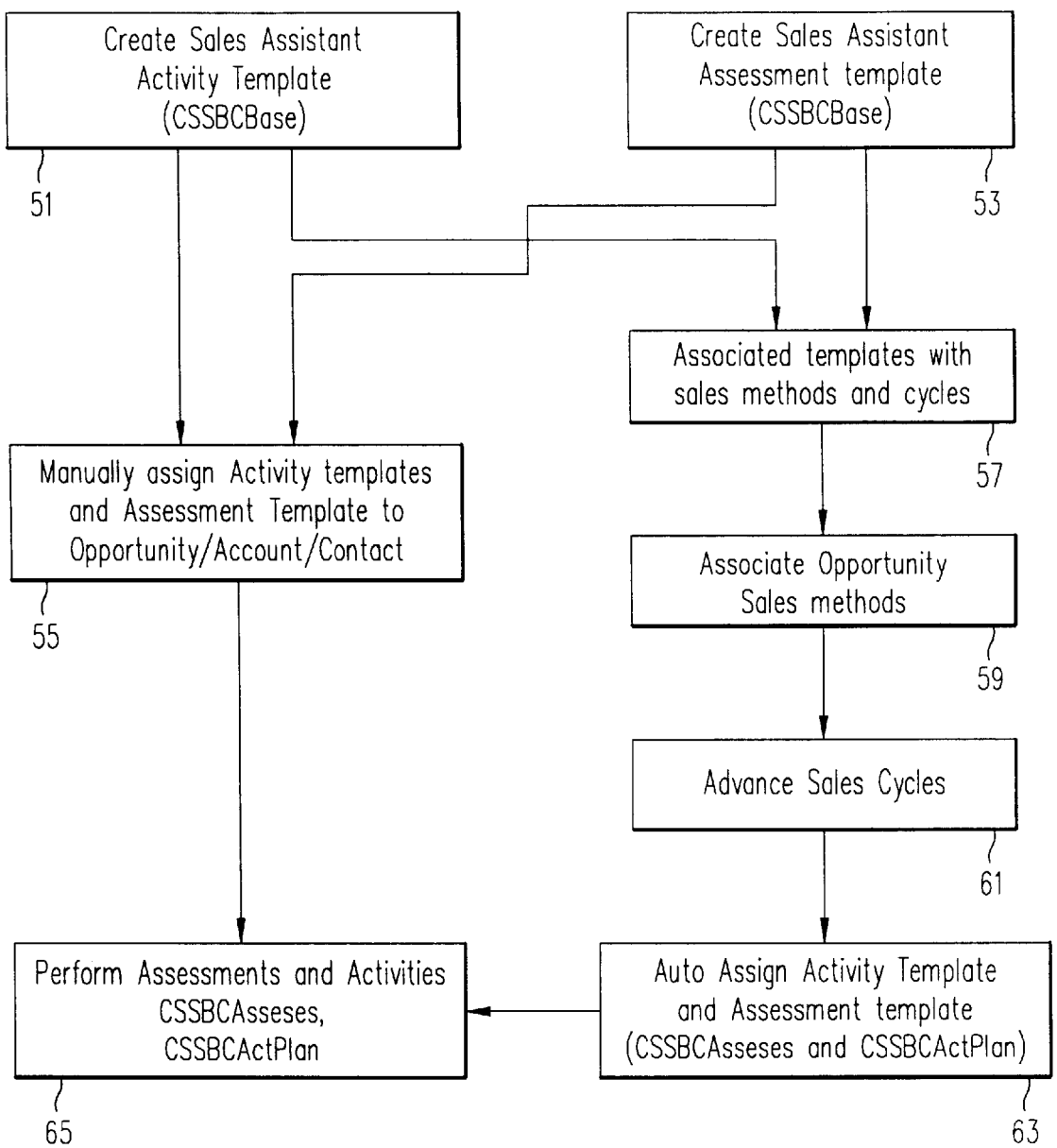
FIG. 6 illustrates a flow chart of the Sales Assistant Module of the method and system of our invention.

As shown in the flow chart of FIG. 6, templates, such as a Sales Assistant Activity Template, block 51, and a Sales Assistant Assessment Template, block 53, are created. These two templates are then manually assigned to Opportunities, Accounts, and Contacts, in block 55. Meanwhile, the templates are also associated with sales methods and opportunities, as shown in block 57 on the right hand side of FIG. 6, and then associated with opportunity sales methods, block 59, and the sales cycles are advanced, block 61. Sales cycles are advanced using the permitted states and the permitted transitions of the state model described herein above. The activity templates and assessment templates are then assigned, block 63, and the assessments and activity plans performed, block 65. The product or output of the assessment and activities function, block 65, is the suggestion of additional actions and assessments, based upon permitted states and state transitions, and the comparison of the deal with optimal deals.

Sales Assistant Module

Sales Assistants Module Technical Description:

Sales Assistants provide a unique method to facilitate and to monitor the life cycle of a sales opportunity, account or a contact. The components included in a C++ exemplification of this method are:

Activity Template Object—a business object that holds a set user definable actions that can be applied to an opportunity/Account/contact.

Assessment template object—a business object that holds a set of user definable assessment rules for evaluating the quality of an opportunity/account/contact.

Sales Assistant Agent—a smart agent program that can assign Activity and Assessment to an opportunity/account/contact based on the sales methodology and cycles.

It would, of course, be understood that the Sales Assistant methodology can be used for production planning and debottlenecking, among other industrial applications.

The following Appendices are code listings for the methods described herein.

I. APPENDIX A - STATE MODEL DEFINITION SOURCE CODE

```
     //////////////////////////////////////////////////////////////////////
     //
     // bcstatem.h  :  State Model Business Component Class functions, types, and
     definitions
     //
     // Copyright (C) 1997, Siebel Systems, L.P., All rights reserved.
     //
     // FILE:         bcstatem.h
     // $Revision: 1 $
     //     $Date: 8/10/99 6:25p $
     //   $Author: Hastings $ of last update
15   //
     // CREATOR:  Michael T. Yu
     //
     //////////////////////////////////////////////////////////////////////
     #ifndef __BCSTATEM_H__
     #define __BCSTATEM_H__

//////////////////////////////////////////////////////////////////////
     //
     //   CSSBCStateModel - CSSBCStateModel Object Class Definition
     //
     //////////////////////////////////////////////////////////////////////
     class SS_EXPORT_CLASS CSSBCStateModel : public CSSBusComp
     {
         SS_DECLARE_DYNCREATE (CSSBCStateModel)

// class member variable declarations
     private:

// class member function declarations
     protected:
                         CSSBCStateModel (void);
         virtual        ~CSSBCStateModel (void);

         virtual  ErrCode  SqlWriteRecord  (void);

public:

         protected:

private:
             virtual  ErrCode  ValidateOverlappedActiveStateModel (void);

};

//////////////////////////////////////////////////////////////////////
     //
     //   CSSBCStateModelState - CSSBCStateModelState Object Class Definition
     //
     //////////////////////////////////////////////////////////////////////
     class SS_EXPORT_CLASS CSSBCStateModelState : public CSSBusComp
     {
         SS_DECLARE_DYNCREATE (CSSBCStateModelState)
     // class member variable declarations private:
```

```
    CString      m_typeValue;

// class member function declarations protected:
                    CSSBCStateModelState (void);
    virtual        ~CSSBCStateModelState (void);

public:

virtual BOOL    HasPickList    (LPCSTR pFieldName);
    virtual ErrCode GetPickList    (LPCSTR pFieldName, CSSBusComp*& pPickList);

protected:

private:

};

////////////////////////////////////////////////////////////////////////////
//
//    CSSBCStateTransition - CSSBCStateTransition Object Class Definition
//
////////////////////////////////////////////////////////////////////////////
class SS_EXPORT_CLASS CSSBCStateTransition : public CSSBusComp
{
    SS_DECLARE_DYNCREATE (CSSBCStateTransition)

// class member variable declarations private:

// class member function declarations protected:
                    CSSBCStateTransition (void);
    virtual        ~CSSBCStateTransition (void);

public:

virtual BOOL    CanUpdate        (LPCSTR pFieldName);

protected:

virtual ErrCode SqlSetFieldValue (LPCSTR pFieldName,
                                      LPCSTR pFieldData);
    virtual ErrCode SqlWriteRecord   (void);

private:

};

endif // __BCSTATEM_H__ static char file_id[] = "$Header:  /v60/src/clients/common/bc/bcstatem.cpp   1
8/10/99 6:25p Hastings $";
////////////////////////////////////////////////////////////////////////////
```

```
//
// bcstatem.cpp : State Model Business Component Class implementation file
//
// Copyright (C) 1995 - 1998, Siebel Systems, L.P., All rights reserved.
//
// FILE:         bcstatem.cpp
// $Revision: 1 $
//     $Date: 8/10/99 6:25p $
//    $Author: Hastings $ of last update
//
// CREATOR:   Michael T. Yu
//
//////////////////////////////////////////////////////////////////////////////// include "stdafx.h"

ifndef __OBJMISC_H__
    #include "objmisc.h"
endif ifndef __BUSCOMP_H__
    #include "buscomp.h"
endif ifndef __BUSOBJ_H__
    #include "busobj.h"
endif ifndef __SQLOBJ_H__
    #include "sqlobj.h"
endif ifndef __BCSTATEM_H__
    #include "bcstatem.h"
#endif

// Comparison operators
#define SQL_OP_IS_NULL        "IS NULL"
#define SQL_OP_IS_NOT_NULL    "IS NOT NULL"
#define SQL_OP_IS_UPDATED     "IS UPDATED"

// extern variables

// extern functions

// global variables

// static variables static BOOL bDebug = FALSE;

// static functions

// MACRO statements
SS_IMPLEMENT_DYNCREATE (CSSBCStateModel,       CSSBusComp)
SS_IMPLEMENT_DYNCREATE (CSSBCStateModelState,  CSSBusComp)
SS_IMPLEMENT_DYNCREATE (CSSBCStateTransition,  CSSBusComp)

// debug declarations
#ifdef _DEBUG
    #undef THIS_FILE
    static char BASED_CODE THIS_FILE[] = __FILE__;
    #define new DEBUG_NEW
endif ////////////////////////////////////////////////////////////////////////////////
//
// CSSBCStateModel Business Component
//
////////////////////////////////////////////////////////////////////////////////

EXPORT CSSBCStateModel::CSSBCStateModel (void)
{
```

```
        }

EXPORT CSSBCStateModel::~CSSBCStateModel (void)
        {
        }

//
        // CSSBCStateModel::SqlWriteRecord
        //
        // Purpose:
        //     Before commit the change verify that there is no other overlapped
        //     active state model defined for the same BusComp/Field
        //

ErrCode CSSBCStateModel::SqlWriteRecord (void)
        {
            ErrCode err;

DO (ValidateOverlappedActiveStateModel ());

DO (CSSBusComp::SqlWriteRecord ());

ll_abort:
            return (err);
        }

//
        // CSSBCStateModel::ValidateOverlappedActiveStateModel
        //
        // Purpose:
        //     Verify that there is no other overlapped active state model
        //     defined for the same BusComp/Field
        //

ErrCode CSSBCStateModel::ValidateOverlappedActiveStateModel (void)
        {
            ErrCode          err;
            CStringArray     errParmArray;
            CSSObjectBase*   pErrChild       = NULL;
            CSSBCStateModel* pBCStateModel   = NULL;
            CSSSqlBCDef*     pSqlBCDef       = NULL;
            CSSRecord*       pRecord         = NULL;
            CString          fieldData;
            CString          Name;
            CString          searchSpec;
            CSSDateTime      dateTime1;
            CSSDateTime      dateTime2;

// create state model buscomp

DOCHILD (m_pModel, GetSqlBCDef (m_busCompName, pSqlBCDef));

m_pModel->ConstructBusComp (pSqlBCDef, m_pBusObj, (CSSBusComp*&) pBCStateModel);

DO (GetErrorCode ());

if (!pBCStateModel)
            {
                err = SSAOMErrConstrBusComp;
                goto ll_abort;
            }

FindWorkSet (m_activeRow, pRecord);

//
            // Construct the search spec for m_pBCStateModel
            // The purpose of constructing this search spec is to ensure that
            // at any given period of time there can be only one active
            // state model against a business object field
            //

DOCHILD (m_pSqlObj, FieldValue (pRecord, "Id", Name));
            AddQuotes (Name, '"');
```

```
        searchSpec =   "([Id] <> " + Name + ") AND ";

DOCHILD (m_pSqlObj, FieldValue (pRecord, "BusComp Name", Name));
        AddQuotes (Name, '"');
        searchSpec +=  "([BusComp Name] = " + Name + ") AND ";

DOCHILD (m_pSqlObj, FieldValue (pRecord, "Field Name", Name));
        AddQuotes (Name, '"');
        searchSpec +=  "([Field Name] = " + Name + ") AND ";

DOCHILD (m_pSqlObj, FieldValue (pRecord, "Activation Date/Time", dateTime1));
        DOCHILD (m_pSqlObj, FieldValue (pRecord, "Expiration Date/Time", dateTime2));

dateTime1.GetAsString (fieldData);
        AddQuotes (fieldData, '"');
        searchSpec +=  "(";
        searchSpec +=      "(";
        searchSpec +=          "([Activation Date/Time] <= " + fieldData + ") AND ";

searchSpec +=      "(";
        searchSpec +=          "([Expiration Date/Time] >= " + fieldData + ") OR ";

searchSpec +=          "([Expiration Date/Time] IS NULL)";
        searchSpec +=      ")";
        searchSpec +=  ") OR ";

if (!dateTime2.IsNull ())
            searchSpec += "(";

searchSpec +=      "([Activation Date/Time] >= " + fieldData + ")";

if (!dateTime2.IsNull ())
        {
            dateTime2.GetAsString (fieldData);
            AddQuotes (fieldData, '"');
            searchSpec +=  " AND ";
            searchSpec +=      "([Activation Date/Time] <= " + fieldData + ")";
            searchSpec +=  ")";
        } searchSpec += ")";

DOCHILD (pBCStateModel, SetNamedSearch ("State Model", searchSpec));

DOCHILD (pBCStateModel, Execute (FALSE, FALSE, TRUE));

DOCHILD (pBCStateModel, Home ());

fieldData.Empty ();

for (err = pBCStateModel->CheckActiveRow (); err == OK;
             err = pBCStateModel->NextRecord ())
        {
            // Concatenate the overlapping state modle names DOCHILD (pBCStateModel, FieldValue ("Name", Name));
            if (fieldData.IsEmpty ())
                fieldData = "\t'" + Name + "'";
            else
                fieldData += "\n\t'" + Name + "'";
        } if (err == SSAOMErrActiveRow)
        {
            // No Active Row: means no overlap.  return OK err = OK;
        }
        else if (err == SSASqlErrEOF)
        {
            err = IDS_ERR_OVERLAPPED_ACTIVE_STATE_MODEL;
            errParmArray.Add (fieldData);
        } ll_abort:
        SetErrorMsg (err, errParmArray, pErrChild);
```

```
        if (pBCStateModel)
        {
            // do not call Release(), it will break the connection of
            // the BusObj and the original BusComp and cause memory leak pBCStateModel->m_pBusObj = NULL;

delete pBCStateModel;
        } return (err);
    }

////////////////////////////////////////////////////////////////////////
    //
    // CSSBCStateModelState Business Component
    //
    ////////////////////////////////////////////////////////////////////////

EXPORT CSSBCStateModelState::CSSBCStateModelState (void)
    {
    }

EXPORT CSSBCStateModelState::~CSSBCStateModelState (void)
    {
    }

//
    // CSSBCStateModelState::HasPickList
    //
    // Purpose:
    //    Dynamically disable the PickList for 'State' field if
    //    the state model field do not have a LOV PickList
    //

BOOL EXPORT CSSBCStateModelState::HasPickList (LPCSTR pFieldName)
    {
        if (lstrcmpi (pFieldName, "State Name") == 0)
        {
            CString             busCompName;
            CString             fieldName;
            CSSPickListDef*     pPickListDef = NULL;
            CSSSqlBCDef*        pSqlBCDef    = NULL;
            CSSSqlFieldDef*     pSqlFieldDef = NULL;

if (!m_pParentBusComp)
                return (FALSE);

// Is parent BusComp "State Model"

if (m_pParentBusComp->m_busCompName != "State Model")
                return (FALSE);

// Get the BusComp name defined for the state model if (m_pParentBusComp->FieldValue ("BusComp Name", busCompName) != OK)
                return (FALSE);

// BusComp name cannot be empty if (busCompName.IsEmpty())
                return (FALSE);

// Get the Field name defined for the state model if (m_pParentBusComp->FieldValue ("Field Name", fieldName) != OK)
                return (FALSE);

// Field name cannot be empty if (fieldName.IsEmpty())
                return (FALSE);
```

```
        // Get BusComp definition if (m_pModel->GetSqlBCDef (busCompName, pSqlBCDef) != OK)
            return (FALSE);

if (!pSqlBCDef)
            return (FALSE);

// Get Field definition if (!pSqlBCDef->GetSqlFieldDef (fieldName, pSqlFieldDef))
            return (FALSE);

if (!pSqlFieldDef)
            return (FALSE);

if (pSqlFieldDef->m_pickListName.IsEmpty ())
            return (FALSE);

// Get PickList definition if (!m_pModel->GetPickListDef (pSqlFieldDef->m_pickListName, pPickListDef))
            return (FALSE);

if (!pPickListDef)
            return (FALSE);

// Get PickList type value if (pPickListDef->m_typeValue.IsEmpty ())
            return (FALSE);

// Get PickList's BusComp definition if (m_pModel->GetSqlBCDef (pPickListDef->m_busCompName, pSqlBCDef))
            return (FALSE);

if (!pSqlBCDef)
            return (FALSE);

// Is table name "S_LST_OF_VAL"

if (pSqlBCDef->m_tableName != "S_LST_OF_VAL")
            return (FALSE);

m_typeValue = pPickListDef->m_typeValue;
    } return (CSSBusComp::HasPickList (pFieldName));
}

//
// CSSBCStateModelState::GetPickList
//
// Purpose:
//    Override CSSBusComp::GetPickList in order to modify the
//    search spec for state field
//

ErrCode CSSBCStateModelState::GetPickList (LPCSTR      pFieldName,
                                           CSSBusComp*& pPickList)
{
    ErrCode    err = OK;

DO (CSSBusComp::GetPickList (pFieldName, pPickList));

if (!strcmpi (pFieldName, "State Name") == 0)
        {
        CString searchSpec;

if (!m_typeValue.IsEmpty ())
            searchSpec = "[Type] = \"" + m_typeValue + "\"";
        else
            searchSpec = "[Id] = \"Junk Row Id\"";
```

```
        pPickList->SetNamedSearch ("State Name Pick List", searchSpec);
    } ll_abort:
    SetErrorMsg (err, NULL, NULL);
    return (err);
}

//////////////////////////////////////////////////////////////////////////
//
// CSSBCStateTransition Business Component
//
//////////////////////////////////////////////////////////////////////////

EXPORT CSSBCStateTransition::CSSBCStateTransition (void)
{
}

EXPORT CSSBCStateTransition::-CSSBCStateTransition (void)
{
}

//
// CSSBCStateTransition::CanUpdate
//
// Purpose:
//     If the "Rule Field Name" is empty do not let the user
//     edit the "Rule Operator" field
//     If the "Rule Operator" is empty, 'IS NULL', 'IS NOT NULL', or
//     'IS UPDATED' do not let the user edit the "Rule Value" field
//

BOOL CSSBCStateTransition::CanUpdate (LPCSTR pFieldName)
{
    if (CString ("Rule Operator") == pFieldName)
    {
        // If the "Rule Field Name" is empty do not let the user
        // edit the "Rule Operator" field CString fieldData;

if (FieldValue ("Rule Field Name", fieldData) == OK &&
            fieldData.IsEmpty ())
        {
            return (FALSE);
        }
    }
    else if (CString ("Rule Value") == pFieldName)
    {
        // If the "Rule Operator" is empty, 'IS NULL', 'IS NOT NULL', or
        // 'IS UPDATED' do not let the user edit the "Rule Value" field CString fieldData;

if ((FieldValue ("Rule Operator", fieldData) == OK) &&
            (fieldData.IsEmpty () ||
             fieldData == SQL_OP_IS_NULL ||
             fieldData == SQL_OP_IS_NOT_NULL ||
             fieldData == SQL_OP_IS_UPDATED))
        {
            return (FALSE);
        }
    } return (CSSBusComp::CanUpdate (pFieldName));
}

//
//
// CSSBCStateTransition::SqlSetFieldValue
//
```

```
// Purpose:
//   If the "Rule Field Name" field is set to empty
//   then  clear the "Rule Value" field
//   If the "Rule Operator" field is set to empty,
//   'IS NULL', 'IS NOT NULL', or 'IS UPDATED' then
//   clear the "Rule Value" field
//

ErrCode CSSBCStateTransition::SqlSetFieldValue (LPCSTR pFieldName,
                                                LPCSTR pFieldData)
{
    ErrCode err;

DO (CSSBusComp::SqlSetFieldValue (pFieldName, pFieldData));

if (CString ("Rule Field Name") == pFieldName)
    {
        // If the "Rule Field Name" field is set to empty
        // then  clear the "Rule Value" field CString fieldData = pFieldData;

if (fieldData.IsEmpty ())
        {
            CSSBusComp::SetFieldValue ("Rule Operator", "");
            CSSBusComp::SetFieldValue ("Rule Value",    "");
        }
    }
    else if (CString ("Rule Operator") == pFieldName)
    {
        // If the "Rule Operator" field is set to empty,
        // 'IS NULL', 'IS NOT NULL', or 'IS UPDATED' then
        // clear the "Rule Value" field CString fieldData = pFieldData;

if (fieldData.IsEmpty () ||
            fieldData == SQL_OP_IS_NULL ||
            fieldData == SQL_OP_IS_NOT_NULL ||
            fieldData == SQL_OP_IS_UPDATED)
        {
            CSSBusComp::SetFieldValue ("Rule Value",    "");
        }
    }
ll_abort:
    return (err);
}

//
//
// CSSBCStateTransition::SqlWriteRecord
//
// Purpose:
//   If the "Rule Field Name" field is not empty then the
//   "Rule Operator" field can not be empty
//   If the "Rule Operator" field is not empty, 'IS NULL',
//   'IS NOT NULL', and 'IS UPDATED' then the "Rule Value"
//   field can not be empty
//

ErrCode CSSBCStateTransition::SqlWriteRecord (void)
{
    ErrCode     err         = OK;
    CString     errParm;
    CString     fieldData;
    CSSField*   pField      = NULL;
    CSSRecord*  pCurRecord  = NULL;

FindWorkSet (m_activeRow, pCurRecord);

DO (SqlFieldValue (pCurRecord, "Rule Field Name", fieldData));

// If the "Rule Field Name" field is not empty then the
    // "Rule Operator" field can not be empty
```

```
        if (!fieldData.IsEmpty ())
        {
           if (GetFieldDef ("Rule Operator", pField))
           {
              DO (SqlFieldValue (pCurRecord, "Rule Operator", fieldData));

if (fieldData.IsEmpty ())
              {
                 err = SSASqlErrReqField;
                 errParm = pField->GetErrorName ();
                 goto ll_abort;
              }
           }
        }

DO (SqlFieldValue (pCurRecord, "Rule Operator", fieldData));

// If the "Rule Operator" field is not empty, 'IS NULL',
        // 'IS NOT NULL', and 'IS UPDATED' then the "Rule Value"
        // field can not be empty if (!fieldData.IsEmpty () &&
            fieldData != SQL_OP_IS_NULL &&
            fieldData != SQL_OP_IS_NOT_NULL &&
            fieldData != SQL_OP_IS_UPDATED)
        {
           if (GetFieldDef ("Rule Value", pField))
           {
              DO (SqlFieldValue (pCurRecord, "Rule Value", fieldData));

if (fieldData.IsEmpty ())
              {
                 err = SSASqlErrReqField;
                 errParm = pField->GetErrorName ();
                 goto ll_abort;
              }
           }
        }
        DO (CSSBusComp::SqlWriteRecord ());

ll_abort:
        SetErrorMsg (err, errParm, NULL);
        return (err);
    }
```

II. APPENDIX B - STATE MACHINE SOURCE CODE

```
    ////////////////////////////////////////////////////////////////////////
    //
    //    CSSBCBase - CSSBCBase Object Class Definition
    //
    ////////////////////////////////////////////////////////////////////////
    class SS_EXPORT_COMMONBCCLASS CSSBCBase : public CSSBusComp
    {
        SS_DECLARE_DYNCREATE (CSSBCBase)

// Other Functionality
        ...
        ...
        ...

        // State Model

BOOL              m_bStateModel;
        CSSQuery*         m_pRuleExpr;
        CSSBusObj*        m_pBOStateModel;
        CSSBusComp*       m_pBCStateModel;
        CSSBusComp*       m_pBCTransition;
        CMapStringToOb    m_mapStateModel;

class StateModel
        {
        public:

StateModel (void)
            {
                m_bLOVPickList    = FALSE;
            }

CString           m_rowId;
            BOOL              m_bLOVPickList;
            CString           m_LOVTypeValue;
            CMapStringToPtr   m_mapStateRestriction;
        };

enum SMDeleteUpdate
        {
            SMDeleteOrUpdate,
            SMDelete,
            SMUpdate
        };
        // Private class for State Model read-only record feature.

class StateRestriction
        {
        public:

StateRestriction (void)
            {
                m_bRestrictDelete      = FALSE;
                m_bRestrictTransition  = FALSE;
                m_bRestrictUpdate      = FALSE;
            }

BOOL m_bRestrictDelete;
            BOOL m_bRestrictTransition;
            BOOL m_bRestrictUpdate;
        };

// Other Functionality
    ...
    ...
    ...
```

```
public:
    virtual  BOOL      CanDelete              (void);
    virtual  BOOL      CanUpdate              (LPCSTR pFieldName);
    virtual  ErrCode   GetPickList            (LPCSTR         pFieldName,
                                               CSSBusComp*&   pPickList);

protected:
                       CSSBCBase (void);
             virtual   ~CSSBCBase (void);

virtual  BOOL      IsChildUpdateDisabled  (LPCSTR pChildName);

virtual  ErrCode   SqlCreate              (CSSSqlBCDef*   pSqlBCDef,
                                               CSSBusObj*     pBusObj,
                                               WORD           busCompType,
                                               CSSSqlObj*     pSqlObj);

virtual  ErrCode   SqlSetFieldValue       (LPCSTR pFieldName,
                                               LPCSTR pFieldData);

// State Model
private:
    ErrCode            ConstructStateModelPickListSearchSpec
                                              (LPCSTR         pFieldName,
                                               CSSBusComp*    pPickList);

BOOL               EvalBoolExpr           (CString strExpr);

ErrCode            LoadStateModel         (void);

ErrCode            VerifyStateModel       (LPCSTR pFieldName,
                                               LPCSTR pFieldData);

void               UnLoadStateModel       (void);

BOOL               CanSMDeleteUpdate      (SMDeleteUpdate type        =
SMDeleteOrUpdate,
                                               LPCSTR         pFieldName = NULL);

BOOL               IsRestrictTransition   (LPCSTR  pFieldName,
                                               CString strFieldData);
};

CSSBCBase::CSSBCBase (void)
{
    // Other Functionality
    ...
    ...
    ...

// State Model
    m_bStateModel         = FALSE;
    m_pBOStateModel       = NULL;
    m_pBCStateModel       = NULL;
    m_pBCTransition       = NULL;
    m_pRuleExpr           = NULL;
}

CSSBCBase::~CSSBCBase (void)
{
    // Other Functionality
```

```
        ...
        ...
        ...
    // State Model

UnLoadStateModel ();
    //
    // Field-level user properties
    //

// Other Functionality
    ...
    ...
    ...
}

//
// CSSBCBase::CanDelete
//
// Purpose:
//
// Override CSSBusComp::CanDelete in order to check if the record can be deleted
// in the row's current state.
//
BOOL CSSBCBase::CanDelete (void)
{
    if (!CanSMDeleteUpdate (SMDelete))
        return (FALSE);

// Other Functionality
    ...
    ...
    ...

return (CSSBusComp::CanDelete ());
}

BOOL CSSBCBase::CanUpdate (LPCSTR pFieldName)
{
    // Other Functionality
    ...
    ...
    ...

if (!CanSMDeleteUpdate (SMUpdate, pFieldName))
        return (FALSE);

// Other Functionality
    ...
    ...
    ...

return (CSSBusComp::CanUpdate (pFieldName));
}

//
//
// CSSBCBase::GetPickList
//
// Purpose:
//
// Override CSSBusComp::GetPickList in order to modify the
// search spec for state model field
//

ErrCode CSSBCBase::GetPickList (LPCSTR     pFieldName,
                                CSSBusComp*& pPickList)
{
    ErrCode    err = OK;
```

```
        DO (CSSBusComp::GetPickList (pFieldName, pPickList));

//
        // Call ConstructStateModelPickListSearchSpec () to add the additional
        // search spec for this PickList if State Model is defined
        //

DO (ConstructStateModelPickListSearchSpec (pFieldName, pPickList));

ll_abort:
        SetErrorMsg (err, NULL, NULL);
        return (err);
    }

BOOL CSSBCBase::IsChildUpdateDisabled (LPCSTR pChildName)
    {
        // Other Functionality
        ...
        ...
        ...

if (!CanSMDeleteUpdate ())
            return (TRUE);

return (CSSBusComp::IsChildUpdateDisabled (pChildName));
    }

ErrCode CSSBCBase::SqlCreate (CSSSqlBCDef*   pSqlBCDef,
                                  CSSBusObj*     pBusObj,
                                  WORD           busCompType,
                                  CSSSqlObj*     pSqlObj)
    {
        // Other Functionality
        ...
        ...
        ...

// ---------------------------------------------------------------------
        // BASESM.CPP

//
        // Load State Model
        //

DO (LoadStateModel ());

// Other Functionality
        ...
        ...
        ...
    }

ErrCode CSSBCBase::SqlSetFieldValue (LPCSTR pFieldName,
                                         LPCSTR pFieldData)
    {
        // Other Functionality
        ...
        ...
        ...

//
        // Check if state transition is allowed
        //

DO (VerifyStateModel (pFieldName, pFieldData));

// Other Functionality
        ...
        ...
        ...
    }
```

```
static char file_id[] = "$Header: /v60/src/clients/common/bc/basesm.cpp 2    9/10/99
18:22 Myu $";
///////////////////////////////////////////////////////////////////////////////
//
// Copyright (C) 1995 - 1998, Siebel Systems, L.P., All rights reserved.
//
// FILE:        basesm.cpp
// $Revision: 2 $
//     $Date: 9/10/99 18:22 $
//    $Author: Myu $ of last update
//
//   CREATOR:   Michael T. Yu
//
// DESCRIPTION
//     Base Business Component Class for State Model implementation file
//
/////////////////////////////////////////////////////////////////////////////// include "stdafx.h"

ifndef __BCBASE_H__
    #include "bcbase.h"
endif ifndef _INC_STDLIB
    #include <stdlib.h>
endif ifndef _INC_STRING
    #include "string.h"
endif ifndef __BUSOBJ_H__
    #include "busobj.h"
endif ifndef __OBJMISC_H__
    #include "objmisc.h"
endif

// extern variables

// extern functions

// global variables

// static variables static BOOL bDebug = FALSE;

// MACRO statements

// debug declarations
#ifdef _DEBUG
    #undef THIS_FILE
    static char BASED_CODE THIS_FILE[] = __FILE__;
    #define new DEBUG_NEW
endif //
// CSSBCBase::LoadStateModel
//
// Purpose:
//
// Load the active state models belong to current BusComp
//

ErrCode CSSBCBase::LoadStateModel (void)
{
    ErrCode       err        = OK;
    CSSObject*    pErrChild  = NULL;
    CString       value;
```

```
        CString             searchSpec;
        CString             fieldData1;
        CString             fieldData2;
        CSSDateTime         dateTime;
        CSSBool             bFlag;
        CSSBusComp*         pMvgBCSMState  = NULL;
        StateModel*         pSM            = NULL;
        StateRestriction*   pSR            = NULL;
        CSSPickListDef*     pPickListDef   = NULL;
        CSSSqlBCDef*        pSqlBCDef      = NULL;
        CSSSqlFieldDef*     pSqlFieldDef   = NULL;
        CSSBCState          state;

//
        // If user property "State Model" is not defined return OK
        // if (!GetUserProperty ((LPCSTR) "State Model", value))
            return (OK);

//
        // If user property "State Model" is not equal to "Y" return OK
        // if (value != "Y")
            return (OK);

//
        // Get "State Model" BusObj
        // and "State Model" and "State Model - Transition" BusComps
        // If State Model is not ready return OK
        // if (m_pModel->GetBusObj         ("State Model - Engine",
                                         m_pBOStateModel) != OK)
            return (OK);

if (m_pBOStateModel->GetBusComp ("State Model",
                                         m_pBCStateModel) != OK)
            return (OK);

if (m_pBOStateModel->GetBusComp ("State Model - Transition",
                                         m_pBCTransition) != OK)
            return (OK);

//
        // Temporarily store the BusComp Name to fieldData1
        // and add quotes to the begining and end of fieldData1
        // fieldData1 = m_busCompName;
        AddQuotes (fieldData1, '"');

//
        // Get current time and add quotes to the begining and end of fieldData2
        // dateTime.SetToNow ();
        dateTime.GetAsString (fieldData2);
        AddQuotes (fieldData2, '"');

//
        // Construct the search spec for m_pBCStateModel
        // searchSpec
            = "([BusComp Name] = " + fieldData1
            + ") AND ([Activation Date/Time] <= " + fieldData2
            + ") AND (([Expiration Date/Time] IS NULL) OR ([Expiration Date/Time] >= "
            + fieldData2 + "))";

DOCHILD (m_pBCStateModel, SetNamedSearch ("State Model", searchSpec));

DOCHILD (m_pBCStateModel, Execute (FALSE, FALSE, TRUE));

DOCHILD (m_pBCStateModel, Home ());
```

```
           for (err = m_pBCStateModel->CheckActiveRow (); err == OK;
                err = m_pBCStateModel->NextRecord ())
           {
              // Store field name and row id into the m_mapStateModel pSM = new StateModel;
              DOCHILD (m_pBCStateModel, FieldValue ("Field Name", fieldData1));
              DOCHILD (m_pBCStateModel, GetIdValue (pSM->m_rowId));
              //
              // Get the State field's PickList definition
              // If the PickList is a LOV PickList set
              // pSM->m_bLOVPickList to TRUE and
              // pSM->m_LOVTypeValue to the appropriate value.
              // if (m_pSqlBCDef->GetSqlFieldDef (fieldData1, pSqlFieldDef))
              {
                 if (!pSqlFieldDef->m_pickListName.IsEmpty ())
                    m_pModel->GetPickListDef (pSqlFieldDef->m_pickListName,
                                              pPickListDef);

if (pPickListDef && !pPickListDef->m_typeValue.IsEmpty ())
                {
                    DOCHILD (m_pModel, GetSqlBCDef (pPickListDef->m_busCompName,
                                                   pSqlBCDef));
                    if (pSqlBCDef && pSqlBCDef->m_tableName == "S_LST_OF_VAL")
                    {
                       pSM->m_bLOVPickList = TRUE;
                       pSM->m_LOVTypeValue  = pPickListDef->m_typeValue;
                    }
                 }
              }

// Load state restriction information

DOCHILD (m_pBCStateModel, GetMvgBusComp ("State Name", pMvgBCSMState));

              // Save the state of "State Model - State" BusComp state.SaveBCState (pMvgBCSMState, "");

DOCHILD (pMvgBCSMState, Execute ());
              DOCHILD (pMvgBCSMState, Home ());

for (; err == OK; err = pMvgBCSMState->NextRecord ())
              {
                 pSR = new StateRestriction ();
                 DOCHILD (m_pBCStateModel, FieldValue ("State Name"    , value));
                 DOCHILD (m_pBCStateModel,
                         FieldValue ("State Restrict Delete Flag"    , bFlag));
                 pSR->m_bRestrictDelete     = bFlag;
                 DOCHILD (m_pBCStateModel,
                         FieldValue ("State Restrict Transition Flag", bFlag));
                 pSR->m_bRestrictTransition = bFlag;
                 DOCHILD (m_pBCStateModel,
                         FieldValue ("State Restrict Update Flag"    , bFlag));
                 pSR->m_bRestrictUpdate     = bFlag;
                 pSM->m_mapStateRestriction.SetAt (value, pSR);
              } m_mapStateModel.SetAt (fieldData1, (CObject*) pSM);

              // Restore the state of "State Model - State" BusComp state.RestoreBCState (pMvgBCSMState);

if ((err == SSAOMErrActiveRow) || (err = SSASqlErrEOF))
                 err = OK;
              else
              {
                 pErrChild = pMvgBCSMState;
                 goto ll_abort;
75            }
           }
```

```
        if (err == SSAOMErrActiveRow)
        {
            // No Active Row: means no active state model defined for current BusComp
            err = OK;
        }
        else if (err == SSASqlErrEOF)
        {
            m_bStateModel = TRUE;
            m_pRuleExpr = new CSSQuery;
            m_pRuleExpr->m_pSqlObj = m_pSqlObj;
            err = OK;
        } ll_abort:

SetErrorMsg (err, NULL, pErrChild);

if (!m_bStateModel)
            UnLoadStateModel ();

return (err);
    } void CSSBCBase::UnLoadStateModel (void)
    {
        if (m_pBOStateModel)
            m_pBOStateModel->Release ();

m_pBOStateModel = NULL;
        m_pBCStateModel = NULL;
        m_pBCTransition = NULL;

if (m_pRuleExpr)
            delete m_pRuleExpr;

m_pRuleExpr = NULL;

if (m_mapStateModel.GetCount () > 0)
        {
            POSITION            posSM;
            POSITION            posSR;
            CString             key;
            StateModel*         pSM      = NULL;
            StateRestriction*   pSR      = NULL;

for (posSM = m_mapStateModel.GetStartPosition (); posSM; )
            {
                m_mapStateModel.GetNextAssoc (posSM, key, (CObject*&) pSM);
                for (posSR = pSM->m_mapStateRestriction.GetStartPosition (); posSR; )
                {
                    pSM->m_mapStateRestriction.GetNextAssoc (posSR, key, (void*&) pSR);
                    delete pSR;
                }
                delete pSM;
            }
        }
    }

//
    //
    // CSSBCBase::ConstructStateModelPickListSearchSpec
    //
    // Purpose:
    //
    // modify the PickList search spec for state model field
    //

ErrCode CSSBCBase::ConstructStateModelPickListSearchSpec (LPCSTR       pFieldName,
                                                              CSSBusComp*  pPickList)
    {
        ErrCode         err         = OK;
```

```
        CSSObject*      pErrChild    = NULL;
        StateModel*     pSM          = NULL;

if (!m_bStateModel)
            return (OK);

if (IsInQueryState ())
        {
            DOCHILD (pPickList, SetNamedSearch ("State Pick List", ""));
            return (OK);
        }

//
        // Locate the field name in the State Model Map
        // m_mapStateModel.Lookup (pFieldName, (CObject*&) pSM);

//
        // If no state model is defined for this field,
        // do not set the additional search spec
        // if (!pSM || pSM->m_rowId.IsEmpty ())
            return (OK);

//
        // Locate the state model
        // if (m_pBCStateModel->PositionById (pSM->m_rowId) == OK)
        {
            BOOL            bShowDefaultState = FALSE;
            CString         fieldData;
            CString         stateFieldData;
            CString         searchSpec;
            CSSRecord*      pRecord           = NULL;

//
            // Get the original field value (From State Name)
            //

GetActiveRecord (pRecord);
            DO (m_pSqlObj->FieldValue (pRecord, pFieldName, stateFieldData));

if (stateFieldData.IsEmpty ())
                bShowDefaultState = TRUE;

if (!bShowDefaultState)
            {
                //
                // Check the "State Restrict Transition Flag" for this field
                // if (!IsRestrictTransition (pFieldName, stateFieldData))
                {
                    DOCHILD (pPickList, SetNamedSearch ("State Pick List", ""));
                    return (OK);
                }

//
                // Construct the search spec for m_pBCTransition
                // fieldData = pSM->m_rowId;
                AddQuotes (fieldData, '"');

// ([State Model Id] = fieldData searchSpec = "([State Model Id] = " + fieldData;

if (pSM->m_bLOVPickList)
                {
                    //
                    // Convert LOV Val to Name
                    //
```

```
            DOCHILD (m_pModel,
                    GetLovValName (stateFieldData, pSM->m_LOVTypeValue, fieldData));
        }
        else
            fieldData = stateFieldData;

AddQuotes (fieldData, '"');

// ) AND ([From State Name] = fieldData searchSpec += ") AND ([From State Name] = " + fieldData;

fieldData = GetPositionId ();
        AddQuotes (fieldData, '"');

// ) AND (([Public Flag] = "Y") OR (EXISTS ([Position Id] = fieldData)))

searchSpec += ") AND (([Public Flag] = \"Y\")";
        searchSpec += " OR (EXISTS ([Position Id] = " + fieldData + ")))";

//
        // Set Named Search
        //

DOCHILD (m_pBCTransition,
                 SetNamedSearch ("State Transition", searchSpec));

DOCHILD (m_pBCTransition, Execute (FALSE, FALSE, TRUE));

DOCHILD (m_pBCTransition, Home ());
    } if (bShowDefaultState || m_pBCTransition->CheckActiveRow () == OK)
    {
        int             index;
        BOOL            bFirst;
        CString         pickListSearchField;
        CString         stateName;
        CSSPickMapDef*  pPickMapDef;

//
        // Get the PickList field name used in the pick map
        // for (bFirst = TRUE;
             pPickList->EnumPickMapDefs (bFirst, pPickMapDef, index);
             bFirst = FALSE)
        {
            if (pFieldName == pPickMapDef->m_fieldName)
            {
                pickListSearchField = pPickMapDef->m_pickFieldName;
                break;
            }
        } searchSpec.Empty ();

if (bShowDefaultState)
        {
            DOCHILD (m_pBCStateModel, FieldValue ("State Name", stateName));
            if (pSM->m_bLOVPickList)
            {
                //
                // Convert LOV Name to Val
                //

DOCHILD (m_pModel,
                         GetLovNameVal (stateName, pSM->m_LOVTypeValue, fieldData));
            }
            else
                fieldData = stateName;

AddQuotes (fieldData, '"');
            searchSpec += "[" + pickListSearchField + "] = " + fieldData;
        }
```

```
                else
                {
                    for (; err == OK; err = m_pBCTransition->NextRecord ())
                    {
                        if (m_pBCTransition->FieldValue ("To State Name",
                                                          stateName) == OK)
                        {
                            if (!searchSpec.IsEmpty ())
                                searchSpec += " OR ";

if (pSM->m_bLOVPickList)
                            {
                                //
                                // Convert LOV Name to Val
                                //
                                DOCHILD (m_pModel,
                                            GetLovNameVal     (stateName,      pSM->m_LOVTypeValue,
fieldData));
                            }
                            else
                                fieldData = stateName;

AddQuotes (fieldData, '"');
                            searchSpec += "[" + pickListSearchField + "] = " + fieldData;
                        }
                    }
                    if (err == SSASqlErrEOF)
                        err = OK;
                } pPickList->SetNamedSearch ("State Pick List", searchSpec);
            }
            else
            {
                //
                // Force the PickList bring up nothing
                //
                pPickList->SetNamedSearch ("State Pick List", "[Id] = \"Junk Row Id\"");
            }
        } ll_abort:
        SetErrorMsg (err, NULL, pErrChild);
        return (err);
    }

//
// CSSBCBase::VerifyStateModel
//
// Purpose:
//
// Validate the state transition
//

ErrCode CSSBCBase::VerifyStateModel (LPCSTR pFieldName,
                                      LPCSTR pFieldData)
{
    ErrCode         err           = OK;
    CStringArray    errParmArray;
    CSSObject*      pErrChild     = NULL;
    StateModel*     pSM           = NULL;

//
    // If undo is in progress skip the validation
    //
    if (IsUndoRedoInProgress ())
        return (OK);

//
    // If no state model is defined for this BusComp skip the validation
    //
```

```
        if (!m_bStateModel)
            return (OK);

//
        // Locate the field name in the State Model Map
        // m_mapStateModel.Lookup (pFieldName, (CObject*&) pSM);

//
        // If no state model is defined for this field skip the validation
        // if (!pSM || pSM->m_rowId.IsEmpty ())
            return (OK);

//
        // Locate the state model
        // if (m_pBCStateModel->PositionById (pSM->m_rowId) == OK)
        {
            CString         searchSpec;
            CString         searchSpecRT;
            CString         oldFieldData;
            CString         newFieldData = pFieldData;
            CString         fieldData;
            CString         ruleExpr;
            CString         stateName;
            CSSRecord*      pRecord      = NULL;

//
            // Get the original field value (From State Name)
            //

GetActiveRecord (pRecord);
            DO (m_pSqlObj->FieldValue (pRecord, pFieldName, oldFieldData));

if (oldFieldData.IsEmpty ())
            {
                //
                // If original field value is "" then the default state model state
                // is the only valid next state.
                //

DOCHILD (m_pBCStateModel, FieldValue ("State Name", stateName));
                if (pSM->m_bLOVPickList)
                {
                    //
                    // Convert LOV Name to Val
                    //

DOCHILD (m_pModel,
                             GetLovNameVal (stateName, pSM->m_LOVTypeValue, fieldData));
                }
                else
                    fieldData = stateName;

//
                // If we enter the default state return OK
                // if (newFieldData == fieldData)
                    return (OK);
            }
            else
            {
#if 0   // Fixed bugs: 12-LNCGD and 12-LNCGF
                //
                // Check the "State Restrict Transition Flag" for this field
                // if (!IsRestrictTransition (pFieldName, oldFieldData))
                    return (OK);
#endif
            }
```

```
//
// Construct the search spec for m_pBCTransition:
// verify the from and to states and the authorization
// fieldData = pSM->m_rowId;
AddQuotes (fieldData, '"');

// ([State Model Id] = fieldData searchSpec = "([State Model Id] = " + fieldData;

if (pSM->m_bLOVPickList)
{
    //
    // Convert LOV Val to Name
    //

DOCHILD (m_pModel,
             GetLovValName (oldFieldData, pSM->m_LOVTypeValue, fieldData));
}
else
    fieldData = oldFieldData;

AddQuotes (fieldData, '"');

// ) AND ([From State Name] = fieldData searchSpec += ") AND ([From State Name] = " + fieldData;

if (pSM->m_bLOVPickList)
{
    //
    // Convert LOV Val to Name
    //

DOCHILD (m_pModel,
             GetLovValName (newFieldData, pSM->m_LOVTypeValue, fieldData));
}
else
    fieldData = newFieldData;

AddQuotes (fieldData, '"');

// ) AND ([To State Name] = fieldData searchSpec += ") AND ([To State Name] = " + fieldData;

searchSpecRT = searchSpec + ")";

fieldData = GetPositionId ();
AddQuotes (fieldData, '"');

// ) AND (([Public Flag] = "Y") OR (EXISTS ([Position Id] = fieldData)))

searchSpec += ") AND (([Public Flag] = \"Y\")";
searchSpec += " OR (EXISTS ([Position Id] = " + fieldData + ")))";

//
// Set Named Search
//

DOCHILD (m_pBCTransition, SetNamedSearch ("State Transition", searchSpec));

DOCHILD (m_pBCTransition, Execute (FALSE, FALSE, TRUE));

DOCHILD (m_pBCTransition, Home ());

if (m_pBCTransition->CheckActiveRow () == OK)
{
    //
    // Valid transition. now validate the rule
    //
    //
```

```
        // Get the simple rule expression data
        //

DOCHILD (m_pBCTransition, FieldValue ("Rule Expression - Simple", ruleExpr));
        if (!ruleExpr.IsEmpty () && !EvalBoolExpr (ruleExpr))
        {
           err = IDS_ERR_STATE_TRANSITION_RULE_VALIDATION;
           errParmArray.Add (ruleExpr);
           errParmArray.Add (oldFieldData);
           errParmArray.Add (newFieldData);
           goto ll_abort;
        }

//
        // Get the rule expression data
        //

DOCHILD (m_pBCTransition, FieldValue ("Rule Expression", ruleExpr));
        if (!ruleExpr.IsEmpty () && !EvalBoolExpr (ruleExpr))
        {
           err = IDS_ERR_STATE_TRANSITION_RULE_VALIDATION;
           errParmArray.Add (ruleExpr);
           errParmArray.Add (oldFieldData);
           errParmArray.Add (newFieldData);
           goto ll_abort;
        }
     }
     else
     {
        //
        // Check the "State Restrict Transition Flag" for this field
        // if Restrict Transition is not checked this state then return OK;
        // Otherwise current transtion is a Invalid transition
        // if (!IsRestrictTransition (pFieldName, oldFieldData))
        {
           DOCHILD    (m_pBCTransition,    SetNamedSearch    ("State    Transition",
    searchSpecRT));
           DOCHILD (m_pBCTransition, Execute (FALSE, FALSE, TRUE));
           DOCHILD (m_pBCTransition, Home ());

if (!m_pBCTransition->CheckActiveRow () == OK)
              return (OK);
           else
           {
              DOCHILD (m_pBCTransition, FieldValue ("Public Flag", fieldData));
              if (fieldData == "Y")
                 return (OK);
           }
        }

//
        // Invalid transition
        // err = IDS_ERR_STATE_TRANSITION_NO_PRIVILEGE;
        errParmArray.Add (oldFieldData);
        errParmArray.Add (newFieldData);
        goto ll_abort;
     }
  } ll_abort:
  SetErrorMsg (err, errParmArray, pErrChild);
  return (err);
}

//
// CSSBCBase::EvalBoolExpr
//
// Purpose:
//
// Returns TRUE if the logic of the expression is TRUE; Otherwise returns FALSE.
//
```

```
BOOL CSSBCBase::EvalBoolExpr (CString strExpr)
{
    ErrCode        err        = OK;
    CSSObject*     pErrChild  = NULL;
    CSSDatum*      pDatum     = NULL;       // Evaluate () result
    CSSRecord*     pRecord;

GetActiveRecord (pRecord);

DOCHILD (m_pRuleExpr, Parse (strExpr));

DOCHILD (m_pRuleExpr, Evaluate (pDatum, pRecord, NULL));

if (pDatum->IsKindOf (RUNTIME_CLASS (CSSBool)))
        return (*((CSSBool*) pDatum));

ll_abort:
    SetErrorMsg (err, NULL, pErrChild);
    return (FALSE);
}

//
// CSSBCBase::CanDeleteUpdate
//
// Purpose:
//
// Check if we can perform the Delete on this record or Update on this field.
//

BOOL CSSBCBase::CanSMDeleteUpdate (SMDeleteUpdate type,
                                   LPCSTR          pFieldName)
{
    ErrCode        err        = OK;
    CSSObject*     pErrChild  = NULL;

if (!m_bStateModel)
        return (TRUE);

if (m_mapStateModel.GetCount () > 0)
    {
        POSITION         posSM;
        CString          strFieldName;
        CString          strStateName;
        CString          strFieldData;
        CString          fieldData;
        StateModel*      pSM        = NULL;
        StateRestriction* pSR       = NULL;

if (type == SMUpdate)
        {
            //
            // If current field is a state field then update is allowed
            // m_mapStateModel.Lookup (pFieldName, (CObject*&) pSM);

if (pSM)
                return (TRUE);
        } for (posSM = m_mapStateModel.GetStartPosition (); posSM; )
        {
            m_mapStateModel.GetNextAssoc (posSM, strFieldName, (CObject*&) pSM);

FieldValue (strFieldName, strFieldData);

if (pSM->m_bLOVPickList)
            {
                //
                // Convert LOV Val to Name
                //

DOCHILD (m_pModel,
                         GetLovValName (strFieldData, pSM->m_LOVTypeValue, fieldData));
```

```
            }
         else
            fieldData = strFieldData;

pSM->m_mapStateRestriction.Lookup (fieldData, (void*&) pSR);

if (pSR)
      {
         if (type == SMDelete)
         {
            if (pSR->m_bRestrictDelete)
               return (FALSE);
         }
         else if (type == SMUpdate)
         {
            if (pSR->m_bRestrictUpdate)
               return (FALSE);
         }
         else// if (type == SMDeleteOrUpdate)
         {
            if (pSR->m_bRestrictDelete ||
                pSR->m_bRestrictUpdate)
               return (FALSE);
         }
      }
   }
} ll_abort:
   return (TRUE);
}

//
// CSSBCBase::IsRestrictTransition
//
// Purpose:
//
// Is the Restrict Transition Flag set for this field.
//

BOOL CSSBCBase::IsRestrictTransition (LPCSTR     pFieldName,
                                      CString    strFieldData)
{
   ErrCode      err         = OK;
   CSSObject*   pErrChild   = NULL;
   CString      fieldData;

if (!m_bStateModel)
      return (FALSE);

if (m_mapStateModel.GetCount () > 0)
   {
      StateModel*         pSM   = NULL;
      StateRestriction*   pSR   = NULL;

//
      // Is the Restrict Transition Flag set for this field.
      // m_mapStateModel.Lookup (pFieldName, (CObject*&) pSM);

if (pSM->m_bLOVPickList)
      {
         //
         // Convert LOV Val to Name
         //
         DOCHILD (m_pModel,
                  GetLovValName (strFieldData, pSM->m_LOVTypeValue, fieldData));
      }
      else
         fieldData = strFieldData;
```

```
        pSM->m_mapStateRestriction.Lookup (fieldData, (void*&) pSR);
        if (pSR && pSR->m_bRestrictTransition)
            return (TRUE);
    }
ll_abort:
    return (FALSE);
}
```

Appendix C - Sales Assistant Class Definition:

```
//////////////////////////////////////////////////////////////////////
//
//  bcactplan.h : Activity Plan Business Component core class
//                definitions
//
//
////////////////////////////////////////////////////////////////////// ifndef __BCACTPLAN_H__
define __BCACTPLAN_H__ ifndef __BCBASE_H__
    #include "bcbase.h"
endif class SS_EXPORT_CLASS CSSBCActivityPlan : public CSSBCBase
{
    SS_DECLARE_DYNCREATE (CSSBCActivityPlan)

friend class    CSSBusComp;
    friend class    CSSBusObj;

protected:
                            CSSBCActivityPlan       (void);
    virtual                 ~CSSBCActivityPlan      (void);

virtual ErrCode SqlSetFieldValue        (LPCSTR pFieldName,
                                             LPCSTR pFieldData);
    virtual ErrCode GetPickList             (LPCSTR pFieldName,
                                             CSSBusComp*& pPickList);
    virtual ErrCode CopyActivityTemplate    (LPCSTR pFieldData);
    virtual ErrCode RescheduleActivities    (LPCSTR pFieldName,
                                             LPCSTR pNewFieldValue = NULL);
};

#endif // __BCACTPLAN_H__

//////////////////////////////////////////////////////////////////////
//
// bcassess.h : Sales Assistants - Assessment
//
// FILE:       bcassess.h
// $Revision: 5 $
//////////////////////////////////////////////////////////////////////
#ifndef __BCASSESS_H__
define __BCASSESS_H__ ifndef __BUSCOMP_H__
    #include "buscomp.h"
endif ifndef __BCBASE_H__
    #include "bcbase.h"
endif ifndef __SQLOBJ_H__
    #include "sqlobj.h"
endif class SS_EXPORT_CLASS CSSBCAssessValue : public CSSBCBase
{
    SS_DECLARE_DYNCREATE (CSSBCAssessValue)

friend class    CSSBusComp;
    friend class    CSSBusObj;

protected:
                            CSSBCAssessValue        (void);
    virtual                 ~CSSBCAssessValue       (void);

private:
```

```
                    ErrCode   SumScore(void);
        public:
                virtual  ErrCode   SqlWriteRecord(void);
                virtual  ErrCode   SqlUndoRecord (void);
                virtual  ErrCode   SqlDeleteRecord(CSSRecord* pRecord);

};
        class SS_EXPORT_SSEBCCLASS CSSBCAssess : public CSSBusComp
        {
            SS_DECLARE_DYNCREATE (CSSBCAssess)

friend class   CSSBusComp;
            friend class   CSSBusObj;
        protected:
                         CSSBCAssess (void);
            virtual      ~CSSBCAssess (void);
        private:
                ErrCode  CopyAttributes   (void);

public:
                virtual  ErrCode  SqlWriteRecord   (void);

virtual  BOOL     CanUpdate(LPCSTR pFieldName);

};
        #endif // __BCASSESS_H__
```

While the invention has been described with respect to certain preferred embodiments and exemplifications, it is not intended to limit the scope of the invention thereby, but solely by the claims appended hereto.

We claim:

1. A method of using a state model that defines the behavior of logical business objects to monitor current status of corresponding business deals, each business object representing a corresponding business deal that can progress through multiple steps in an associated business process until completion, the state model including a set of permitted states and a set of permitted transitions between the permitted states and corresponding to the business process in such a manner that each of the permitted states represent one of multiple business process steps, the method comprising the steps of:

selecting a template for the state model;

defining permitted state transitions for the state model that are each from a permitted "from state" of the state model and to a permitted "to state" of the state model;

associating state transitions of the state model with state transition rules and conditions;

extracting the state transition rules from a database, wherein the permitted states, the permitted transitions, and the extracted state transition rules comprise a state machine execution engine for the state model;

using the state machine execution engine to determine a current state for each of the business objects, the current state reflecting a current status of the business deal corresponding to the business object in progressing through the multiple steps of the associated business process, the business deals being in multiple distinct states of progression through the steps of the business process;

generating a sales pipeline funnel model with multiple sections that represents the current status of the business deals corresponding to the business objects, each section of the sales pipeline funnel model corresponding to one or more of the steps of the business process such that the business deals currently progressing through those corresponding business process steps are associated with that section of the sales pipeline funnel model; and displaying a sales pipeline graphic for the sales pipeline funnel model for use in monitoring current status of business deals, the sales pipeline graphic showing the current status of the business deals associated with the multiple sections of the sales pipeline funnel model.

2. The method of claim 1 wherein at least one of said state transition rules include prerequisites which must be met before the transition is permitted.

3. The method of claim 1 wherein at least one of said state transition rules define authorized users for effecting a state transition.

4. The method of claim 1 wherein the business deals represented by the business objects are worked in different methodologies, and wherein the pipeline graphic simultaneously displays the current status for the business objects with the different methodologies.

5. The method of claim 4 wherein said methodologies are chosen from the group consisting of telesales process deals, strategic deals, and standard process deals.

6. The method of claim 4 comprising grouping business deals by sales methodology.

7. The method of claim 4 comprising classifying deals.

8. The method of claim 7 comprising classifying deals as qualifying deals, working deals, and closing deals.

9. The method of claim 4 comprising creating a sales opportunity.

10. The method of claim 9 comprising creating a sales method.

11. The method of claim 10 comprising breaking the sales method into sales cycles within the sales method.

12. The method of claim 11 comprising breaking the sales cycles down into sales phases for each sales cycle.

13. The method of claim 10 comprising associating a sales method with a sales opportunity.

14. The method of claim 13 comprising advancing the sales opportunity based upon the associated sales method.

15. The method of claim 14 comprising sorting sales opportunities.

16. The method of claim 15 comprising sorting and grouping sales opportunities by at least one of sales methods, cycles, and phases.

17. The method of claim 16 comprising passing the data, grouped by one or more of sales method, sales cycle, and deal phase, to a charting engine, and from the charting engine to the Sales Pipeline Funnel Chart.

18. The method of claim 1 further comprising monitoring the state of at least one of the business objects representing a business deal as it moves from state to state.

19. The method of claim 18 wherein the monitoring is performed to determine additional actions with respect to the business deal.

20. The method of claim 18 comprising assigning activity and assessment templates to a deal in process.

21. The method of claim 1, further comprising:

selecting an assessment template and providing an assessment based on the assessment template.

22. The method of claim 21, wherein the assessment template is associable with a recommendation that is based upon the defined permitted state transitions.

23. The method of claim 21, further comprising:

associating the selected assessment template with at least one state transition of the state model.

24. The method of claim 1, further comprising:

selecting an activity template.

25. The method of claim 24, further comprising:

associating the selected activity template with at least one business object components selected for the state model.

26. The method of claim 24, further comprising:

associating the selected activity template with at least one of the permitted state transitions.

27. A system running on at least one computer for preparing a state model defining the behavior of logical objects in a process as a set of permitted states and a set of permitted transitions between the permitted states, and said system configured to:

select a template for the state model;

select object components for the state model;

select or define state transitions for the state model;

select an assessment template;

define permitted state transitions from a "from state' to a "to state" with a State Transition Rule name;

associate state transitions with state transition rules, names, and conditions;

enumerate the state transition names and state transition rule names;

extract the state transition rules from a database; wherein said states, transitions, and extracted rules comprise a state machine execution engine;

process a model through said state machine execution engine; and provide an assessment corresponding to the selected assessment template.

28. A system running on at least one computer for using a state model that defines behavior of logical business objects, each business object representing a corresponding business deal that can progress through multiple steps in an associated business, the state model including a set of permitted states and a set of permitted transitions between the permitted states and corresponding to the business process in such a manner that each of the permitted states represent one of multiple business process steps, said system configured to:

select a template for the state model;

define permitted state transitions for the state model that are each from a Permitted "from state' of the state model and to a permitted "to state" of the state model;

associate state transitions of the state model with state transition rules and conditions;

use a state machine execution engine for the state model to determine current states for the business objects, the current state of a business object reflecting a current status of the corresponding business deal in progressing through the steps of the associated business process, the business deals being in multiple distinct states of progression through the steps of the business process, the state machine execution engine based on the permitted states, the Permitted transitions and the state transition rules;

generate a sales pipeline funnel model that represents the business deals, the sales pipeline funnel model having multiple sections that each correspond to one or more of the steps of the business process such that the business deals currently progressing through those corresponding business process steps are associated with that section of the sales pipeline funnel model; and display a sales pipeline graphic for the sales pipeline funnel model that shows the current status of the business deals associated with the multiple sections of the sales pipeline funnel model.

29. The system of claim 27 wherein at least one of said state transition rules define authorized users for effecting a state transition.

30. The system of claim 28, wherein the business deals are worked in different methodologies, and wherein pipeline graphic simultaneously displays the current status for the business objects with the different methodologies.

31. The system of claim 30 wherein said methodologies are chosen from the group consisting of telesales process deals, strategic deals, and standard process deals.

32. The system of claim 30 wherein the system is configured to grouping business deals by sales methodology.

33. The system of claim 30 wherein the system is configured to classify deals.

34. The system of claim 33 wherein the system is configured to classify deals as qualifying deals, working deals, and closing deals.

35. The system of claim 30 wherein the system is configured to create a sales opportunity.

36. The system of claim 35 wherein the system is configured to create a sales method.

37. The system of claim 36 wherein the system is configured to break the sales method into sales cycles within the sales method.

38. The system of claim 37 wherein the system is configured to break the sales cycles down into sales phases for each sales cycle.

39. The system of claim 36 wherein the system is configured to associate a sales method with a sales opportunity.

40. The system of claim 39 wherein the system is configured to advance the sales opportunity based upon the associated sales method.

41. The system of claim 40 wherein the system is configured to sort sales opportunities.

42. The system of claim 41 wherein the system is configured to sort and group sales opportunities by at least one of sales methods, cycles, and phases.

43. The system of claim 42 wherein the system is configured to pass the data, grouped by one or more of sales method, sales cycle, and deal phase, to a charting engine, and from the charting engine to the Sales Pipeline Funnel Chart.

44. The system of claim 28 wherein the system is configured to monitor the state of deal as it moves from state to state.

45. The system of claim 44 wherein the monitoring of the state of the deal is to determine additional actions with respect to the deal.

46. The system of claim 28, further configured to:

select an assessment template for using in providing assessments and associate the selected assessment template with at least one business object components selected for the state model.

47. The system of claim 46, wherein the assessment template is associable with a recommendation that is based upon defined permitted state transitions.

48. The system of claim 46, further configured to:

associate the selected assessment template with at least one state transition of the state model.

49. The system of claim 23, further configured to:

select an activity template.

50. The system of claim 49, further configured to:

associate the selected activity template with at least one business object components selected for the state model.

51. The system of claim 49, further configured to:

associate the selected activity template with at least one of the permitted state transitions.

* * * * *

UNITED STATES PATENT AND TRADEMARK OFFICE
CERTIFICATE OF CORRECTION

PATENT NO.     : 6,665,648 B2
DATED          : December 16, 2003
INVENTOR(S)    : Karen Cheung Brodersen et al.

It is certified that error appears in the above-identified patent and that said Letters Patent is hereby corrected as shown below:

Column 68,
Line 49,

"A system running on at least one computer for preparing a state model defining the behavior of logical objects in a process as a set of permitted states and a set of permitted transitions between the permitted states, and said system configured to:
  select a template for the state model;
  select object components for the state model;
  select or define state transitions for the state model;
  select an assessment template;
  define permitted state transitions from a "from state" to a "to state" with a State Transistion Rule name;
  associate state transitions with state transition rules, names and conditions;
  enumerate the state transition names and state transition rule names;
  extract the state transition rules from a database; wherein said states, transitions, and extracted rules
     comprise a state machine execution engine;
  process a model through said state machine execution engine; and
  provide an assessment corresponding to the selected assessment template." should be --A system running on at least one computer for using a state model that defines behavior of logical business objects, each business object representing a corresponding business deal that can progress through multiple steps in an associated business process, the state model including a set of permitted states and a set of permitted transitions between the permitted states and corresponding to the business process in such a manner that each of the permitted states represent one of multiple business process steps, said system configured to:

select a template for the state model;

define permitted state transitions for the state model that are each from a permitted "from state' of the
     state model and to a permitted "to state" of the state model;

associate state transitions of the state model with state transition rules and conditions;

UNITED STATES PATENT AND TRADEMARK OFFICE
CERTIFICATE OF CORRECTION

PATENT NO. : 6,665,648 B2
DATED : December 16, 2003
INVENTOR(S) : Karen Cheung Brodersen et al.

It is certified that error appears in the above-identified patent and that said Letters Patent is hereby corrected as shown below:

Column 68 (cont'd), use a state machine execution engine for the state model to determine current states for the business objects, the current state of a business object reflecting a current status of the corresponding business deal in progressing through the steps of the associated business process, the business deals being in multiple distinct states of progression through the steps of the business process, the state machine execution engine based on the permitted states, the permitted transitions and the state transition rules;

generate a sales pipeline funnel model that represents the business deals, the sales pipeline funnel model having multiple sections that each correspond to one or more of the steps of the business process such that the business deals currently progressing through those corresponding business process steps are associated with that section of the sales pipeline funnel model; and display a sales pipeline graphic for the sales pipeline funnel model that shows the current status of the business deals associated with the multiple sections of the sales pipeline funnel model.--

Signed and Sealed this

Eighth Day of June, 2004

JON W. DUDAS
*Acting Director of the United States Patent and Trademark Office*